(12) United States Patent
Fujimura

(10) Patent No.: US 10,571,778 B2
(45) Date of Patent: Feb. 25, 2020

(54) ADAPTER FOR AN ELECTRONIC VIEW FINDER, CAMERA, AND ELECTRONIC VIEW FINDER

(71) Applicant: FUJIFILM Corporation, Tokyo (JP)

(72) Inventor: Yuichi Fujimura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/245,444

(22) Filed: Jan. 11, 2019

(65) Prior Publication Data

US 2019/0146308 A1 May 16, 2019

Related U.S. Application Data

(63) Continuation of application No. PCT/JP2017/024514, filed on Jul. 4, 2017.

(30) Foreign Application Priority Data

Jul. 28, 2016 (JP) .................................. 2016-148780

(51) Int. Cl.
*G03B 13/16* (2006.01)
*G03B 13/10* (2006.01)
(Continued)

(52) U.S. Cl.
CPC ............. *G03B 13/16* (2013.01); *G03B 13/10* (2013.01); *G03B 17/563* (2013.01);
(Continued)

(58) Field of Classification Search
None
See application file for complete search history.

(56) References Cited

U.S. PATENT DOCUMENTS 4,256,393 A * 3/1981 Dietrich ................. G03B 15/03
396/198
4,769,665 A * 9/1988 Dagborn ................ G03B 17/14
396/213
(Continued)

FOREIGN PATENT DOCUMENTS

JP          10-232438 A     9/1998
JP          11-338024 A    12/1999
(Continued)

OTHER PUBLICATIONS

International Preliminary Report on Patentability and Written Opinion of the International Searching Authority (forms PCT/IB/373, PCT/ISA/237, and PCT/IB/326), dated Feb. 7, 2019, for corresponding International Application No. PCT/JP2017/024514, with a Written Opinion translation.

(Continued)

*Primary Examiner* — William B Perkey
(74) *Attorney, Agent, or Firm* — Birch, Stewart, Kolasch & Birch, LLP

(57) ABSTRACT

There are provided an adapter for an electronic view finder, a camera, and an electronic view finder of which user's imaging operability can be improved, a space can be saved during carry, and the size of the camera can be reduced for a user who does not need the function of a retrofit electronic view finder. An adapter 16 for an electronic view finder includes a base member 102 that includes an accessory shoe-mounting portion 54 to be attachably and detachably mounted on an accessory shoe 20, a first connector 64 that is to be attachably and detachably connected to an output-side connector 56 provided on the accessory shoe 20, a tilting member 104, an accessory shoe 106 that is provided on the tilting member 104, and a second connector 108 that is to be attachably and detachably connected to an input-side (Continued)

connector 110 for an image signal for a finder provided on an electronic view finder 14 and is electrically connected to the first connector 64.

11 Claims, 17 Drawing Sheets

(51) Int. Cl.
*G03B 17/56* (2006.01)
*H04N 5/225* (2006.01)
*H04N 5/232* (2006.01)

(52) U.S. Cl.
CPC ..... *H04N 5/22525* (2018.08); *H04N 5/23293* (2013.01); *G03B 2213/02* (2013.01)

(56) References Cited

U.S. PATENT DOCUMENTS

| | | | |
|---|---|---|---|
| 2004/0160523 A1* | 8/2004 | Mogi | H04N 5/2252 348/333.07 |
| 2006/0146179 A1 | 7/2006 | Nakamura et al. | |
| 2006/0146180 A1 | 7/2006 | Nakamura et al. | |
| 2006/0146181 A1 | 7/2006 | Nakamura et al. | |
| 2006/0204239 A1* | 9/2006 | Inaba | G03B 35/00 396/325 |
| 2011/0216208 A1* | 9/2011 | Matsuzawa | H04N 5/23203 348/211.2 |
| 2013/0010134 A1* | 1/2013 | Motoki | G03B 15/05 348/207.99 |
| 2013/0258179 A1* | 10/2013 | Shintani | H04N 5/2251 348/371 |
| 2014/0022399 A1* | 1/2014 | Rashid | H04N 5/23206 348/207.11 |
| 2015/0168808 A1* | 6/2015 | PeQueen | G03B 13/02 348/341 |
| 2015/0215483 A1* | 7/2015 | Farnsworth | F16M 13/02 348/207.1 |
| 2019/0146308 A1* | 5/2019 | Fujimura | H04N 5/22525 396/373 |

FOREIGN PATENT DOCUMENTS

| | | |
|---|---|---|
| JP | 11-355618 A | 12/1999 |
| JP | 2004-147233 A | 5/2004 |
| JP | 2007-116271 A | 5/2007 |
| JP | 2014-109699 A | 6/2014 |

OTHER PUBLICATIONS

International Search Report (form PCT/ISA/210), dated Oct. 10, 2017, for corresponding International Application No. PCT/JP2017/024514, with an English translation.

German Office Action dated Nov. 29, 2019. issued in German Patent Application No. 11 2017 003 176.1 (with English translation).

* cited by examiner

ADAPTER FOR AN ELECTRONIC VIEW FINDER, CAMERA, AND ELECTRONIC VIEW FINDER

CROSS-REFERENCE TO RELATED APPLICATIONS

The present application is a Continuation of PCT International Application No. PCT/JP2017/024514 filed on Jul. 4, 2017 claiming priority under 35 U.S.C. § 119(a) to Japanese Patent Application No. 2016-148780 filed on Jul. 28, 2016. Each of the above applications is hereby expressly incorporated by reference, in their entirety, into the present application.

BACKGROUND OF THE INVENTION

1. Field of the Invention

The present invention relates to an adapter for an electronic view finder that is used to attachably and detachably mount an electronic view finder on an accessory shoe of a camera body, a camera on which the adapter for an electronic view finder is to be mounted, and an electronic view finder that is to be mounted on the adapter for an electronic view finder.

2. Description of the Related Art

JP1999-355618A (JP-H11-355618A) discloses a retrofit electronic view finder that is attachably and detachably mounted on an accessory shoe provided on a camera body. The electronic view finder includes a display unit that displays an image on the basis of an image signal received from the camera body, a finder unit where a lens system used to enlarge and observe the display unit is stored in a housing, and a mounting unit that is used to mount the finder unit on the camera body and is engagably and disengagably mounted on the accessory shoe provided on the camera body.

Further, the electronic view finder disclosed in JP1999-355618A (JP-H11-355618A) includes a tilt mechanism that supports the view finder unit to allow the finder unit to be movable rotationally with respect to the camera body in an up-down direction and a pan mechanism that supports the finder unit to allow the view finder unit to be movable rotationally with respect to the camera body along a horizontal plane. According to the electronic view finder disclosed in JP1999-355618A (JP-H11-355618A), a retrofit electronic view finder, which is compact and is easy to use, can be provided for a camera on which a monitor device is not mounted or a camera in which a small liquid crystal monitor is built.

On the other hand, JP2014-109699A discloses a digital camera system where a plate, which is exchangeable and attachable and detachable, can be installed at an upper portion of a camera body and various accessories, such as an electronic view finder, can be mounted through the plate. According to JP2014-109699A, it is possible to realize a digital camera system that is neat and compact in a situation where accessories are not needed and does not obstruct the user's operation of a camera as much as possible even in a situation where an accessory is mounted.

SUMMARY OF THE INVENTION

Incidentally, since the electronic view finder disclosed in JP1999-355618A (JP-H11-355618A) includes at least the tilt mechanism, there is a problem that the electronic view finder disclosed in JP1999-355618A (JP-H11-355618A) is larger and heavier than the retrofit electronic view finder, which is disclosed in JP2014-109699A and does not include the tilt mechanism, by the size and weight of the tilt mechanism.

On the other hand, the retrofit electronic view finder disclosed in JP2014-109699A has small size and small weight and excellent portability, but cannot change the position of an eyepiece part of the electronic view finder (the position of an eyepiece part with respect to the camera body in the up-down direction. Hereinafter, referred to as a tilt position) to a desired tilt position. For this reason, there is a problem that the imaging operability of the retrofit electronic view finder disclosed in JP2014-109699A is lower than that of the electronic view finder disclosed in JP1999-355618A (JP-H11-355618A) and including the tilt mechanism. Accordingly, in a case in which a user wants to use the retrofit electronic view finder disclosed in JP2014-109699A and having low imaging operability and the electronic view finder disclosed in JP1999-355618A (JP-H11-355618A) having high imaging operability, the user should carry both electronic view finders. For this reason, there is a problem that a space cannot be saved during the carry of the camera.

Moreover, in a case in which a monitor device also used as an electronic view finder is mounted on a camera body, it depends on a user but a certain user may give priority to a reduction in the size of the camera without retrofitting an electronic view finder and may take an image while confirming a subject with the monitor device.

The invention has been made in consideration of the above-mentioned circumstances, and an object of the invention is to provide an adapter for an electronic view finder, a camera, and an electronic view finder of which user's imaging operability can be improved, a space can be saved during carry, and the size of the camera can be reduced for a user who does not need the function of a retrofit electronic view finder.

In order to achieve the object, there is provided an adapter for an electronic view finder of the invention that is used to attachably and detachably mount an electronic view finder on a first accessory shoe of a camera body. The adapter for an electronic view finder comprises: a base member that includes an accessory shoe-mounting portion to be attachably and detachably mounted on the first accessory shoe; a first connector that is provided on the accessory shoe-mounting portion and is to be attachably and detachably connected to an output-side connector for an image signal for a finder provided on the first accessory shoe in conjunction with attachment/detachment of the accessory shoe-mounting portion to/from the first accessory shoe; a tilting member that is tiltably mounted on the base member; a second accessory shoe that is provided on the tilting member; and a second connector that is provided on the second accessory shoe, is to be attachably and detachably connected to an input-side connector for an image signal for a finder provided on the electronic view finder, and is electrically connected to the first connector.

The invention is to achieve the object of the invention by providing an adapter for an electronic view finder including a tilt mechanism.

That is, according to an aspect of the adapter for an electronic view finder of the invention, since the adapter for an electronic view finder includes a tilt mechanism, an eyepiece part of the electronic view finder can be changed to a desired tilt position by the tilt mechanism. Accordingly, user's imaging operability can be improved. Further, since the adapter for an electronic view finder and a retrofit electronic view finder may be carried during the carry of the camera, a space can be saved during the carry of the camera in comparison with a form in the related art where two electronic view finders should be carried. Furthermore, a user who does not need the function of the retrofit electronic view finder confirms a subject using a monitor device of the camera body without mounting the electronic view finder on the camera body through the adapter for an electronic view finder. Accordingly, the size of the camera can be reduced for a user who does not need the function of the retrofit electronic view finder.

It is preferable that the aspect of the adapter for an electronic view finder of the invention further comprises a pan member provided between the base member and the tilting member and supporting the tilting member to allow the tilting member to be movable rotationally. Accordingly, the position of the eyepiece part of the electronic view finder (the position of the eyepiece part with respect to the camera body in a horizontal direction. Hereinafter, referred to as a pan position) can be changed to a desired pan position. Accordingly, the imaging operability of the electronic view finder is further improved by a synergistic effect between the pan member and the tilt mechanism.

It is preferable that the aspect of the adapter for an electronic view finder of the invention further comprises: a tilt restricting member restricting a tilt of the tilting member and releasing the regulation of the tilt of the tilting member; and a pan restricting member restricting a rotational movement of the tilting member and releasing the regulation of the rotational movement of the tilting member. Accordingly, a subject can be confirmed in a state in which the tilt position and the pan position of the electronic view finder are restricted (locked) at a desired posture.

In the aspect of the adapter for an electronic view finder of the invention, it is preferable that the pan member is provided with a center recognition unit recognizing a center position of the tilting member with respect to the base member. Since a user can easily recognize the center position of the tilting member in a case in which the user wants to face and confirm a subject by the electronic view finder in a state in which the tilting member corresponds to the center position, it is convenient.

In the aspect of the adapter for an electronic view finder of the invention, it is preferable that the second accessory shoe is provided on the tilting member at a position deviating from the accessory shoe-mounting portion in a case in which the base member and the tilting member are parallel to each other. For example, in a case in which the base member and the tilting member are parallel to each other in a state in which the tilting member corresponds to the center position, a user can look into the electronic view finder at a position where the user's face is spaced from the back surface of the camera body.

In the aspect of the adapter for an electronic view finder of the invention, it is preferable that the base member includes a second reinforcing portion to be engaged with a first reinforcing portion provided around the first accessory shoe of the camera body and the second reinforcing portion is a rail member to be engaged with the first reinforcing portion in a case in which the accessory shoe-mounting portion is mounted on the first accessory shoe. Accordingly, a connection portion between the output-side connector for an image signal for a finder provided on the first accessory shoe and the first connector of the base member can be reinforced by an engagement force between the first and second reinforcing portions. Further, since the second reinforcing portion is a rail member, the second reinforcing portion functions as a guide member that connects the first connector of the accessory shoe-mounting portion to the output-side connector of the first accessory shoe in a case in which the accessory shoe-mounting portion of the adapter for an electronic view finder is to be moved and mounted on the first accessory shoe of the camera body.

In the aspect of the adapter for an electronic view finder of the invention, it is preferable that the tilting member includes a fourth reinforcing portion to be engaged with a third reinforcing portion provided around the input-side connector of the electronic view finder and the fourth reinforcing portion is a rail member to be engaged with the third reinforcing portion in a case in which the electronic view finder is mounted on the second accessory shoe. Accordingly, a connection portion between the second connector of the second accessory shoe and the input-side connector of the electronic view finder can be reinforced by an engagement force between the third and fourth reinforcing portions. Further, since the fourth reinforcing portion is a rail member, the fourth reinforcing portion functions as a guide member that connects the input-side connector to the second connector in a case in which the input-side connector of the electronic view finder is to be moved and mounted on the second accessory shoe of the adapter for an electronic view finder.

Furthermore, there is provided a camera of the invention on which an adapter for an electronic view finder used to attachably and detachably mount an electronic view finder on a first accessory shoe of a camera body is mounted. The adapter for an electronic view finder includes: a base member that includes an accessory shoe-mounting portion to be attachably and detachably mounted on the first accessory shoe; a first connector that is provided on the accessory shoe-mounting portion and is to be attachably and detachably connected to an output-side connector for an image signal for a finder provided on the first accessory shoe in conjunction with attachment/detachment of the accessory shoe-mounting portion to/from the first accessory shoe; a tilting member that is tiltably mounted on the base member; a second accessory shoe that is provided on the tilting member; and a second connector that is provided on the second accessory shoe, is to be attachably and detachably connected to an input-side connector for an image signal for a finder provided on the electronic view finder, and is electrically connected to the first connector. The base member includes a second reinforcing portion that is to be engaged with a first reinforcing portion provided around the first accessory shoe of the camera body, and the second reinforcing portion is a rail member that is to be engaged with the first reinforcing portion in a case in which the accessory shoe-mounting portion is mounted on the first accessory shoe. The camera comprises the first reinforcing portion to be engaged with the second reinforcing portion of the adapter for an electronic view finder.

According to an aspect of the camera of the invention, a connection portion between the output-side connector for an image signal for a finder provided on the first accessory shoe and the first connector of the base member can be reinforced by an engagement force between the first and second reinforcing portions.

In the aspect of the camera of the invention, it is preferable that the first reinforcing portion is a rail member provided around the first accessory shoe of the camera body. Accordingly, the first reinforcing portion functions as a guide member that connects the first connector of the accessory shoe-mounting portion to the output-side connector of the first accessory shoe in a case in which the accessory shoe-mounting portion of the adapter for an electronic view finder is to be moved and mounted on the first accessory shoe of the camera body.

In addition, there is provided an electronic view finder of the invention that is mounted on an adapter for an electronic view finder used to attachably and detachably mount the electronic view finder on a first accessory shoe of a camera body. The adapter for an electronic view finder includes: a base member that includes an accessory shoe-mounting portion to be attachably and detachably mounted on the first accessory shoe; a first connector that is provided on the accessory shoe-mounting portion and is to be attachably and detachably connected to an output-side connector for an image signal for a finder provided on the first accessory shoe in conjunction with attachment/detachment of the accessory shoe-mounting portion to/from the first accessory shoe; a tilting member that is tiltably mounted on the base member; a second accessory shoe that is provided on the tilting member; and a second connector that is provided on the second accessory shoe, is to be attachably and detachably connected to an input-side connector for an image signal for a finder provided on the electronic view finder, and is electrically connected to the first connector. The tilting member includes a fourth reinforcing portion that is to be engaged with a third reinforcing portion provided around the input-side connector of the electronic view finder, and the fourth reinforcing portion is a rail member that is to be engaged with the third reinforcing portion in a case in which the electronic view finder is mounted on the second accessory shoe. The electronic view finder comprises the third reinforcing portion to be engaged with the fourth reinforcing portion of the adapter for an electronic view finder.

According to an aspect of the electronic view finder of the invention, a connection portion between the second connector of the second accessory shoe and the input-side connector of the electronic view finder can be reinforced by an engagement force between the third and fourth reinforcing portions.

In the aspect of the camera of the invention, it is preferable that the third reinforcing portion is a rail member provided around the input-side connector of the electronic view finder. Accordingly, the third reinforcing portion functions as a guide member that connects the input-side connector to the second connector in a case in which the input-side connector of the electronic view finder is to be moved and mounted on the second accessory shoe of the adapter for an electronic view finder.

According to the adapter for an electronic view finder, the camera, and the electronic view finder of the invention, user's imaging operability can be improved, a space can be saved during carry, and the size of the camera can be reduced for a user who does not need the function of a retrofit electronic view finder.

DESCRIPTION OF THE PREFERRED EMBODIMENTS

Preferred embodiments of the invention will be described in detail below with reference to the accompanying drawings.

Figure 1:
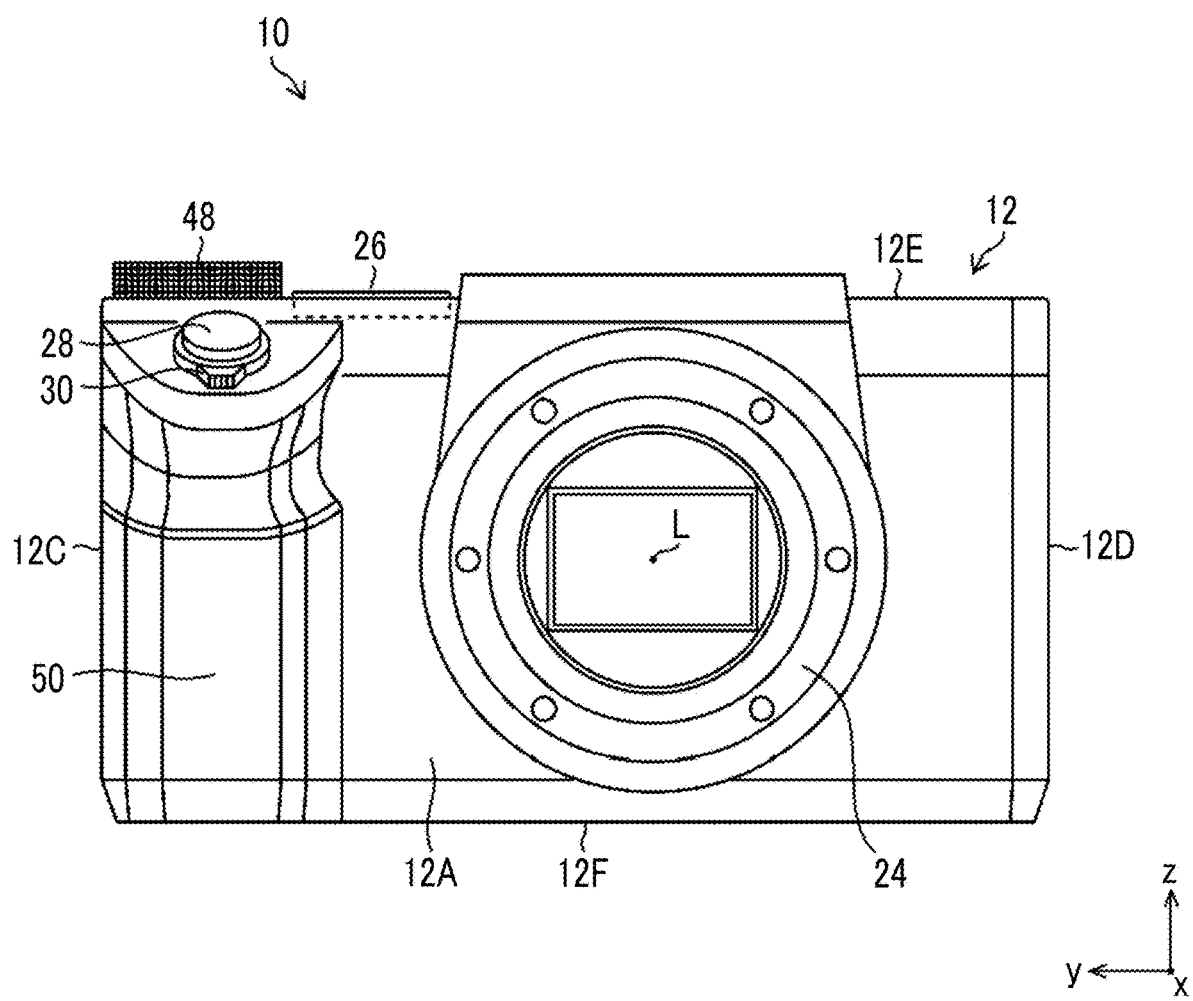
FIG. 1 is a front view of a camera body of a digital camera to which a camera of the invention is applied.
Figure 2:
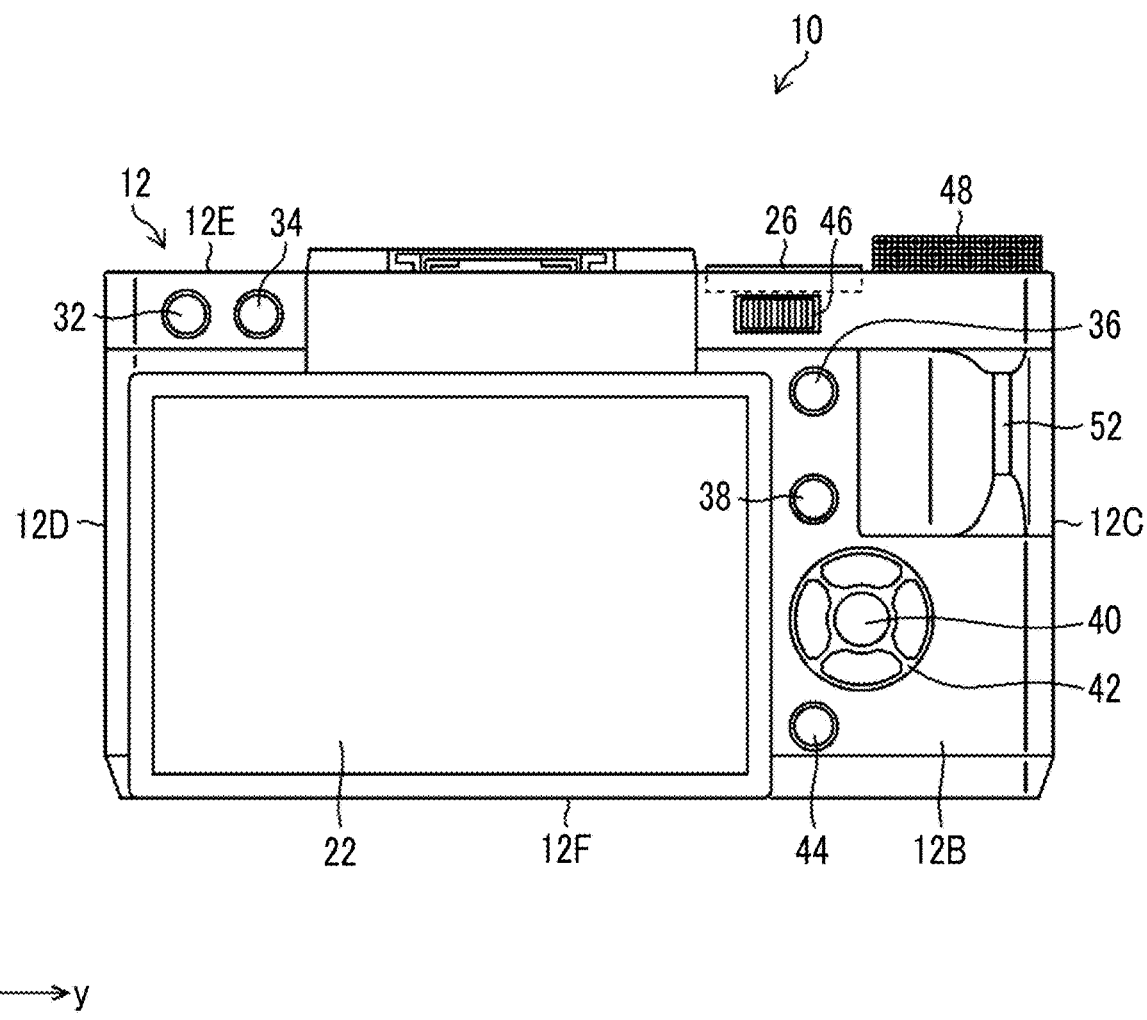
FIG. 2 is a back view of the camera body shown in FIG. 1.
Figure 3:
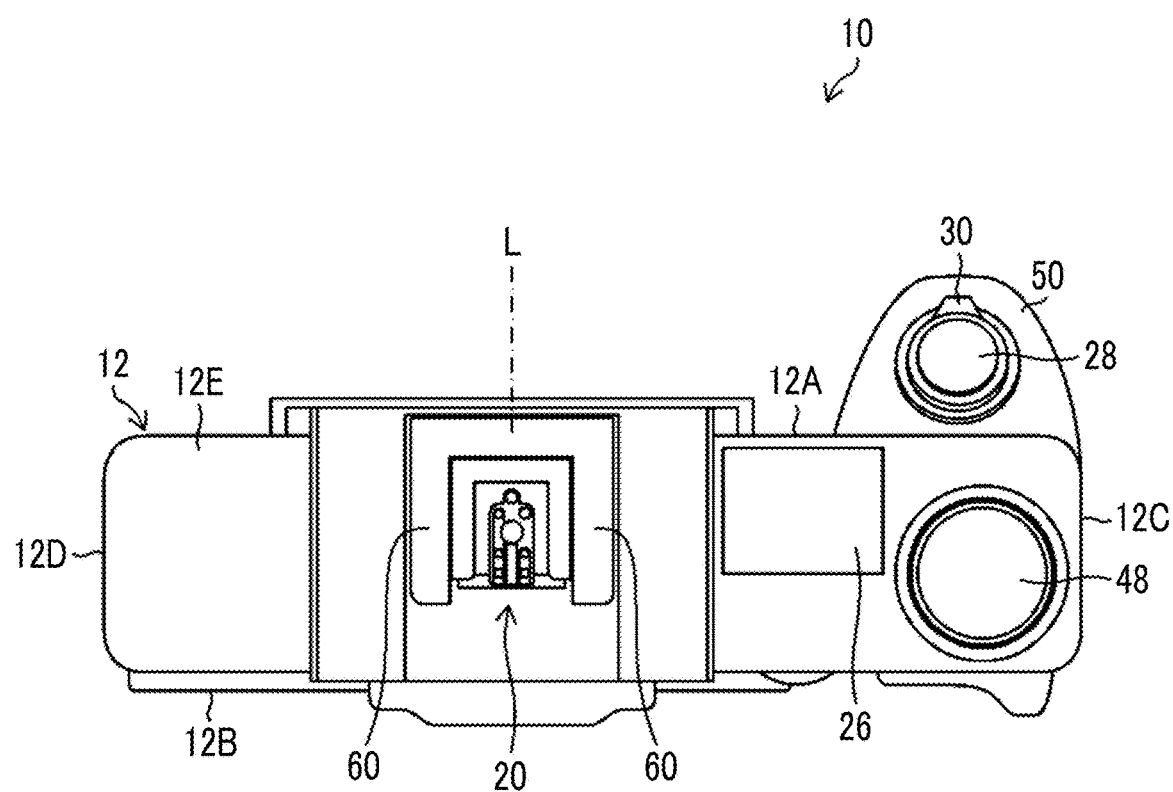
FIG. 3 is a top view of the camera body shown in FIG. 1.

FIG. 1 is a front view showing an example of an embodiment of a camera body 12 of a digital camera 10 to which a camera of the invention is applied, FIG. 2 is a back view showing the example of the embodiment of the camera body 12, and FIG. 3 is a top view showing the example of the embodiment of the camera body 12.

Figure 4:
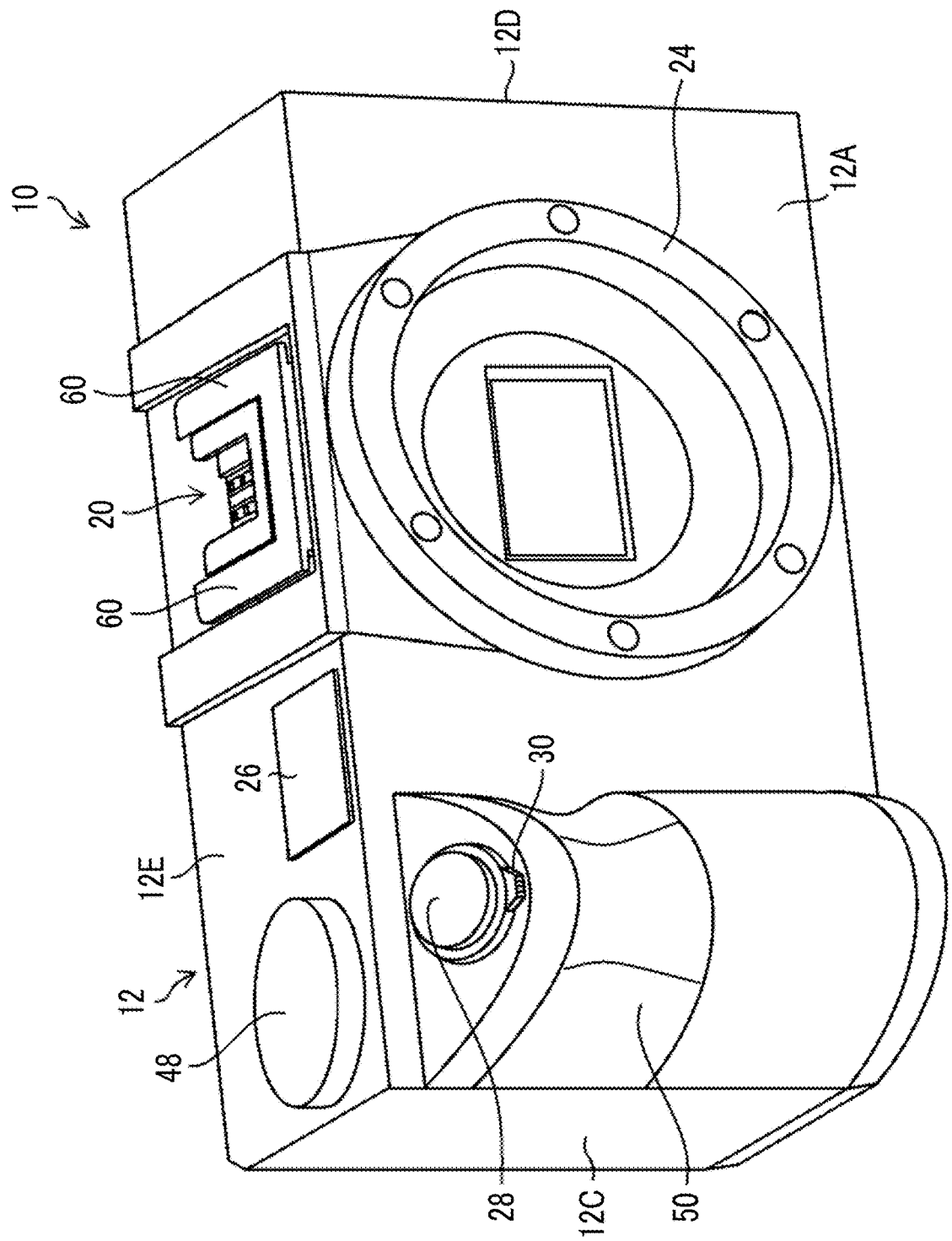
FIG. 4 is a perspective view of the camera body shown in FIG. 1 that is viewed from the front side.
Figure 5:
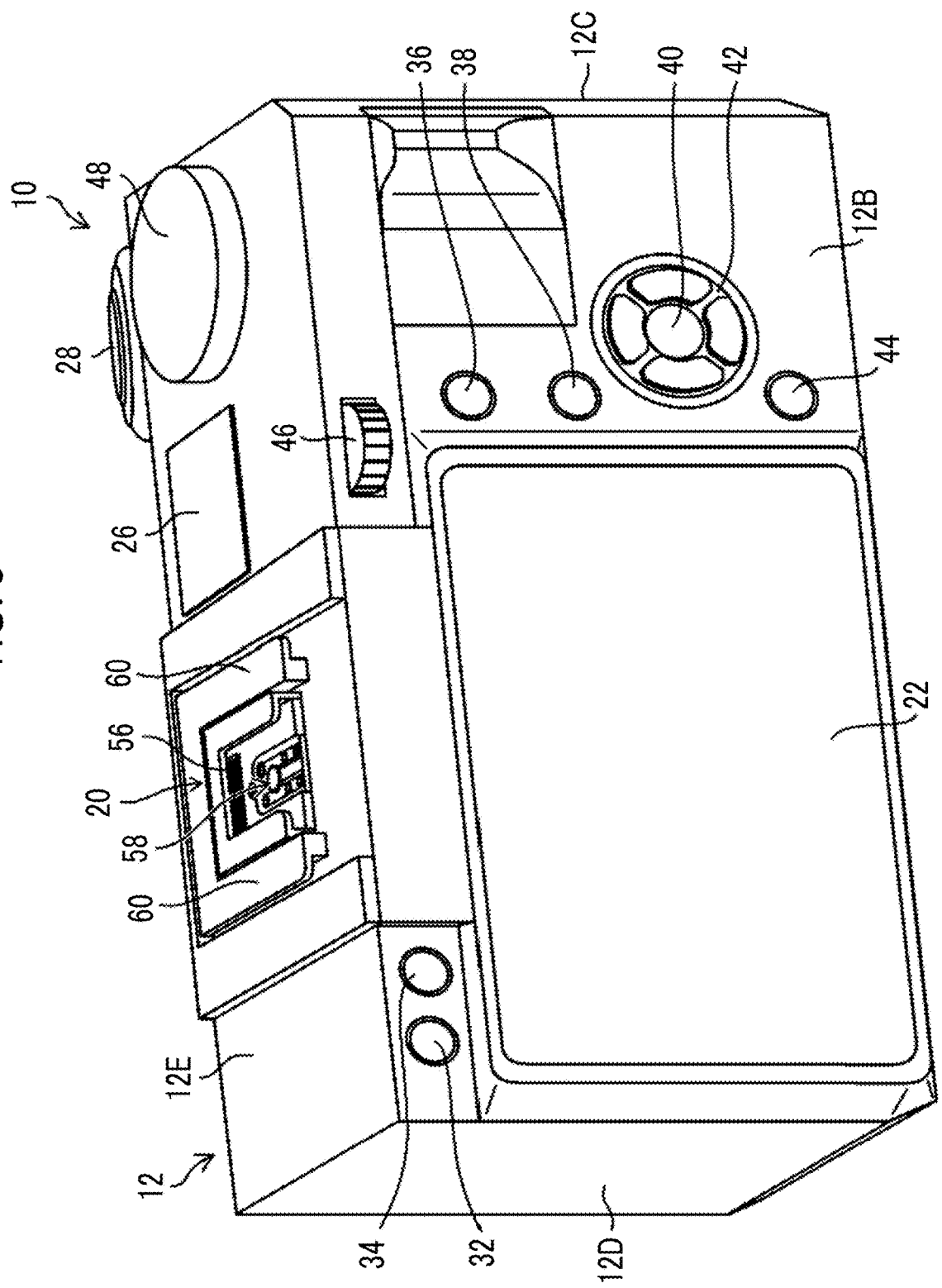
FIG. 5 is a perspective view of the camera body shown in FIG. 1 that is viewed from the back side.

Further, FIG. 4 is a perspective view of the camera body 12 that is viewed from the front side, and FIG. 5 is a perspective view of the camera body 12 that is viewed from the back side.

Figure 6:
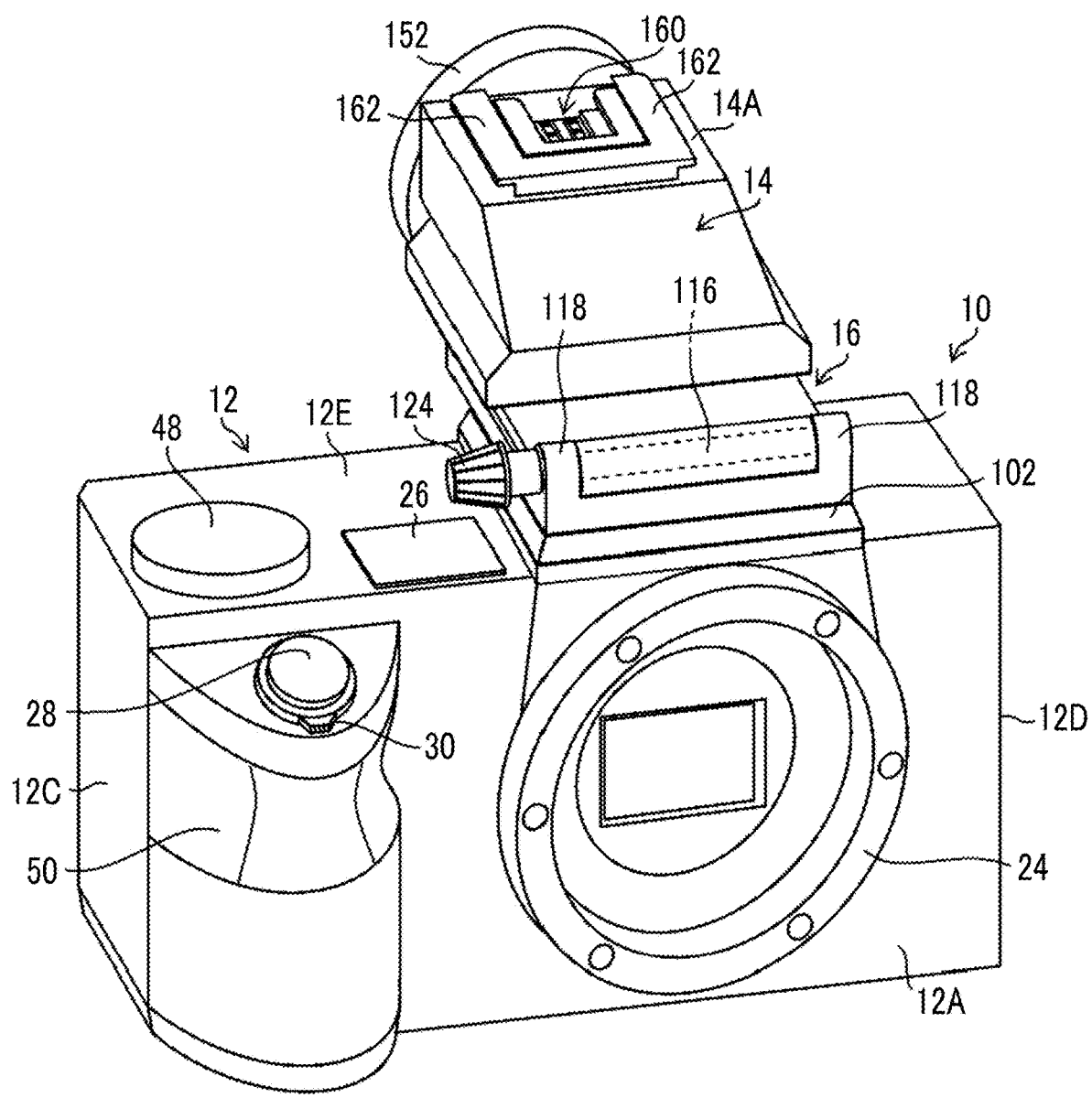
FIG. 6 is a perspective view of the camera body on which an electronic view finder is mounted through an adapter for an electronic view finder.

Furthermore, FIG. 6 is a perspective view of the camera body 12 on which an electronic view finder 14 of the embodiment is attachably and detachably mounted through an adapter 16 for an electronic view finder of the embodiment.

Figure 7:
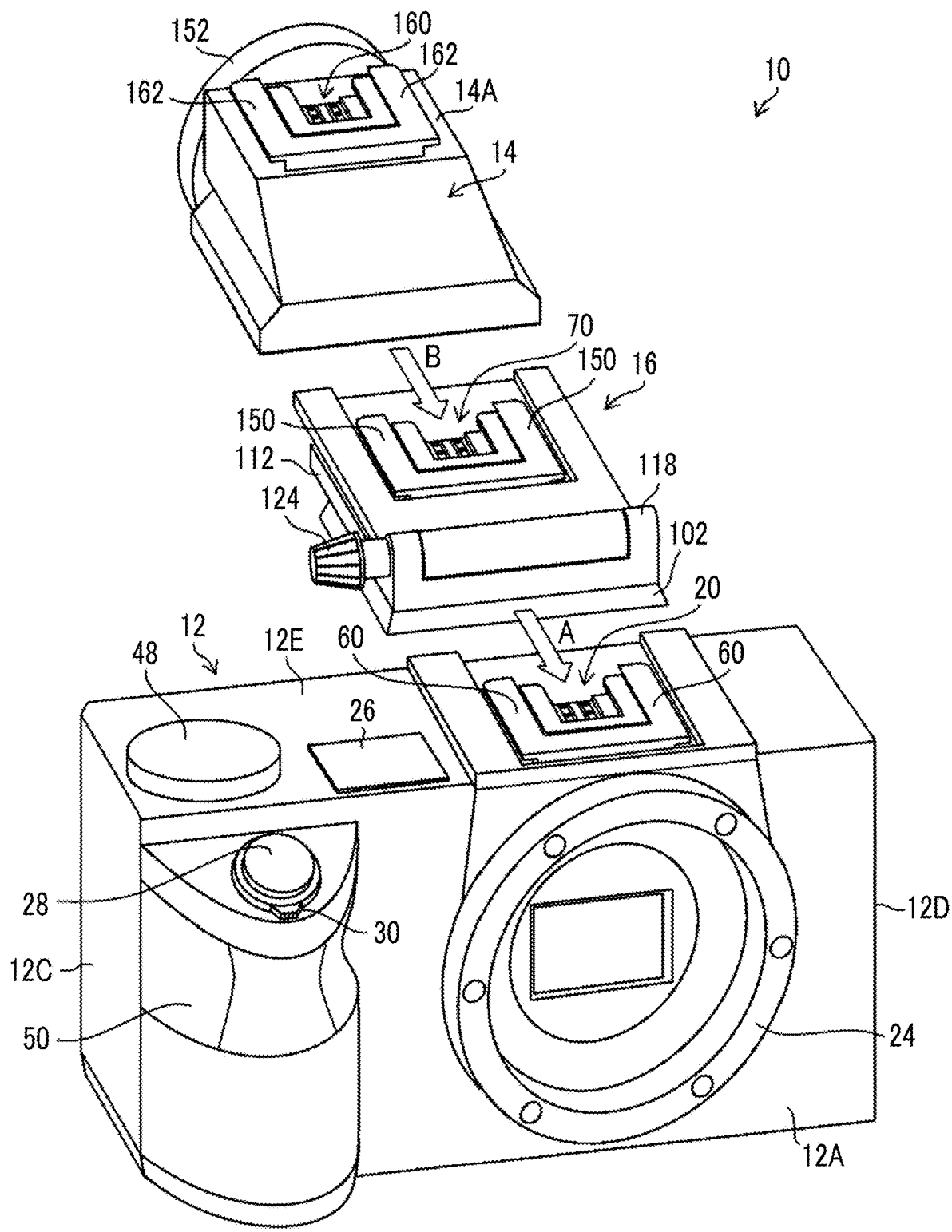
FIG. 7 is an assembly perspective view showing the electronic view finder and the adapter for an electronic view finder that are separated from the camera body.
Figure 8:
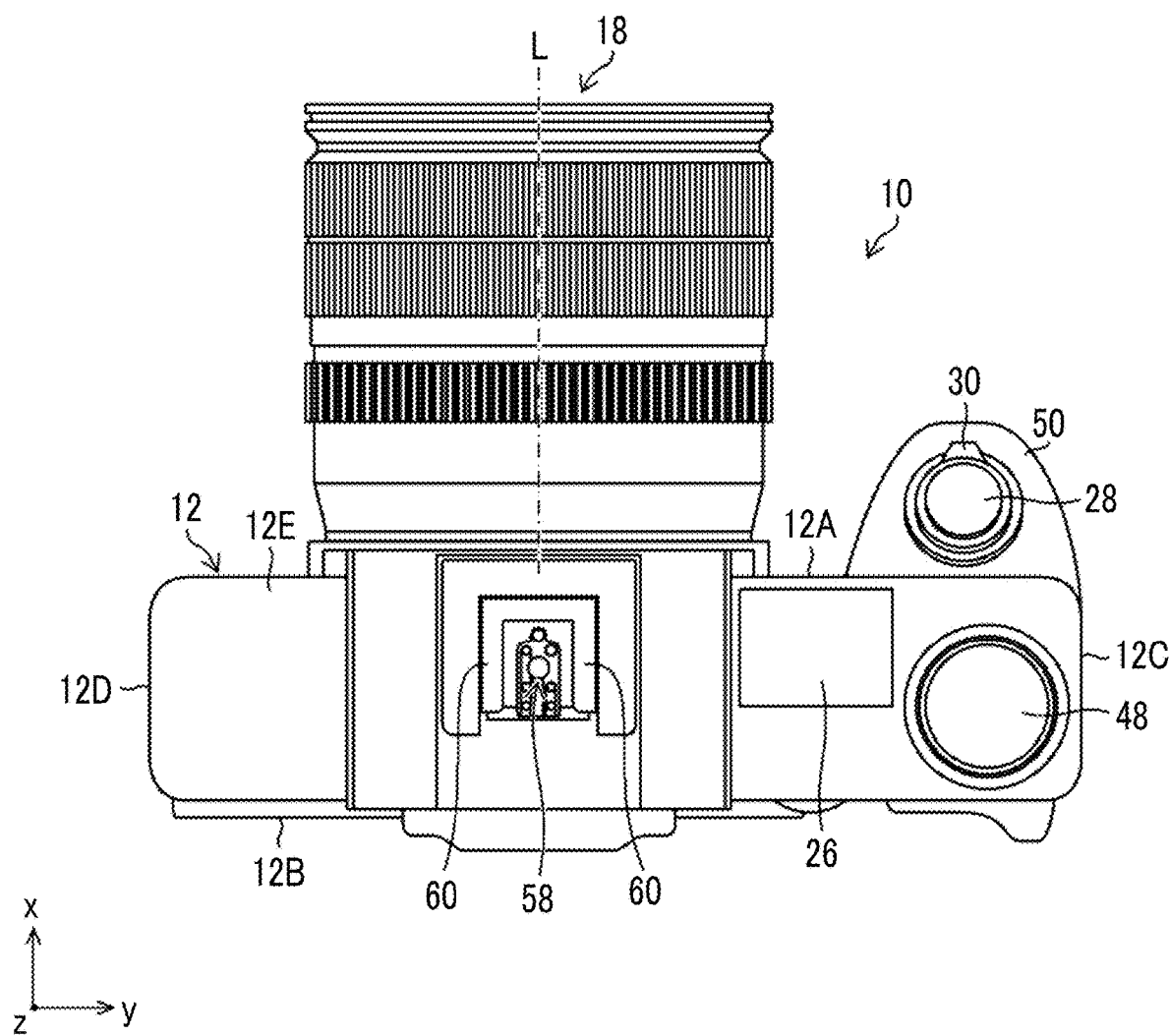
FIG. 8 is a top view of the digital camera in which an imaging lens is mounted on the camera body.

Further, FIG. 7 is a perspective view showing the electronic view finder 14 and the adapter 16 for an electronic view finder that are separated from the camera body 12. An arrow A of FIG. 7 indicates a direction in which the adapter 16 for an electronic view finder is mounted on the camera body 12, and an arrow B indicates a direction in which the electronic view finder 14 is mounted on the adapter 16 for an electronic view finder. The direction of the arrow A and the direction of the arrow B are the same direction. Furthermore, FIG. 8 is a top view of the digital camera 10 in which an imaging lens 18 is mounted on the camera body 12. FIG.

9 is a block diagram showing the configuration of a control system of the digital camera 10.

First, a plurality of directions around the camera body 12 are defined and the respective constituent surfaces of the camera body 12 are defined on the basis of FIGS. 1 to 3. An x direction of FIG. 3 extending along an imaging optical axis L of the digital camera 10 is defined as a front-rear direction, a subject side is defined as a front side, and a user side where the digital camera 10 is operated is defined as a rear side. Accordingly, the constituent surface of the camera body 12 facing the subject side is defined as a front surface 12A, and the constituent surface facing the user side opposite to the front surface 12A is defined as a back surface 12B. Further, a y direction of FIGS. 1 to 3, which is orthogonal to the imaging optical axis L, is defined as the width direction of the digital camera 10, the right constituent surface in the y direction of FIG. 2 is defined as a right side surface 12C, and the left constituent surface is defined as a left side surface 12D. Furthermore, a z direction of FIGS. 1 and 2 orthogonal to the x direction and the y direction is defined as a height direction of the digital camera 10, the constituent surface on which an accessory shoe 20 as a first accessory shoe is provided is defined as an upper surface 12E, and the constituent surface opposite to the upper surface 12E is defined as a bottom 12F.

[Digital Camera 10]

The digital camera 10 of the embodiment is a lens-interchangeable digital camera, and is a non-reflex digital camera. The lens-interchangeable digital camera means a digital camera of which an imaging lens 18 shown in FIG. 8 can be interchanged. The non-reflex digital camera means a digital camera not including a reflex mirror for guiding an incidence ray, which is incident from the imaging lens 18, to an optical finder, and is also referred to as a mirrorless digital camera. The digital camera 10 of the embodiment does not include an optical finder, and an electronic view finder 14 of the embodiment to be described later or a main display 22 as a monitor device provided on the back surface 12B is used as a finder.

<Camera Body 12>

As shown in FIGS. 1 to 4, the camera body 12 is provided with an accessory shoe 20, a main display 22, a lens mount 24, a sub-display 26, and the like on predetermined constituent surface thereof. Further, a shutter button 28, a power supply lever 30, a play button 32, a delete button 34, an AF lock button 36, an AE lock button 38, a menu button 40, a selector button 42, a BACK button 44, a rear command dial 46, an operation dial 48, and the like are provided on the predetermined constituent surfaces as operation members.

The camera body 12 has the shape of a rectangular box that is thin in the front-rear direction (x direction). The right side surface 12C of the camera body 12 is formed as a grip portion. A user grips the grip portion and releases the shutter button 28. The grip portion is provided with a grip 50 that protrudes on the front surface 12A and a thumb rest 52 that is provided on the back surface 12B.

<Lens Mount 24>

The lens mount 24 is a mounting portion for the imaging lens 18 shown in FIG. 8. As shown in FIG. 1, the lens mount 24 is provided on the front surface 12A of the camera body 12. The imaging lens 18 is attachably and detachably mounted on the lens mount 24. The lens mount 24 is formed of a bayonet mount.

<Main Display 22>

The main display 22 is a display that is used to mainly display an image, but is also used as an electronic view finder. As shown in FIG. 2, the main display 22 is provided on the back surface 12B of the camera body 12. The main display 22 is formed of, for example, a color liquid crystal display (LCD).

An image to be displayed on the main display 22 includes a live view image in addition to a taken image. Live view is a function to display an image, which is taken by an image sensor, in real time. The angle of view, a focus state, and the like can be confirmed on the main display through live view.

Further, the main display 22 is also used as a graphical user interface (GUI). That is, in a case in which various settings are to be performed, a setting screen is displayed on the main display 22 and various settings are performed on the setting screen.

<Sub-Display 26>

The sub-display 26 is formed of a display device of which the screen is smaller than the screen of the main display 22. As shown in FIG. 3, the sub-display 26 is provided on the upper surface 12E of the camera body 12. The sub-display 26 is formed of, for example, a reflective LCD provided with an illumination lamp. The sub-display 26 includes a rectangular display surface, and the short side of the sub-display 26 is disposed in parallel to the imaging optical axis L. More specifically, the short side of the sub-display 26 is disposed along the front-rear direction (x direction), and the long side of the sub-display 26 is disposed along the width direction (y direction).

The contents of settings of the digital camera 10 are mainly displayed on the sub-display 26. Information to be displayed on the sub-display 26 includes at least information about the set values of items to be set by the operation dial 48.

<Accessory Shoe 20>

Figure 10:
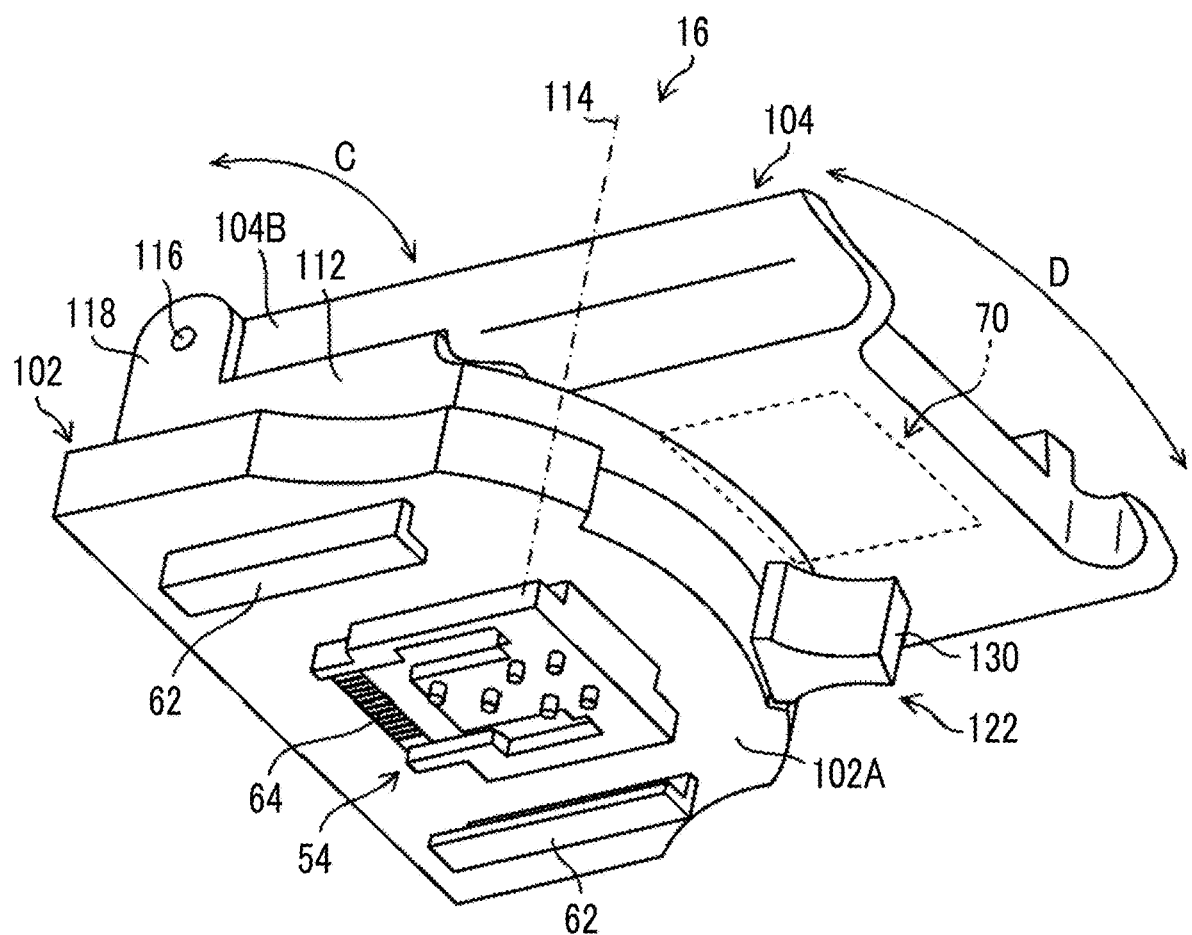
FIG. 10 is a perspective view of the adapter for an electronic view finder that is viewed from the bottom side.

The accessory shoe 20 is a mounting portion on which an accessory shoe-mounting portion 54 (see FIG. 10) of the adapter 16 for an electronic view finder of the embodiment is to be attachably and detachably mounted, and is provided on the upper surface 12E of the camera body 12. FIG. 10 is a perspective view of the adapter 16 for an electronic view finder that is viewed from the bottom side. The structure of the adapter 16 for an electronic view finder will be described later.

Figure 11:
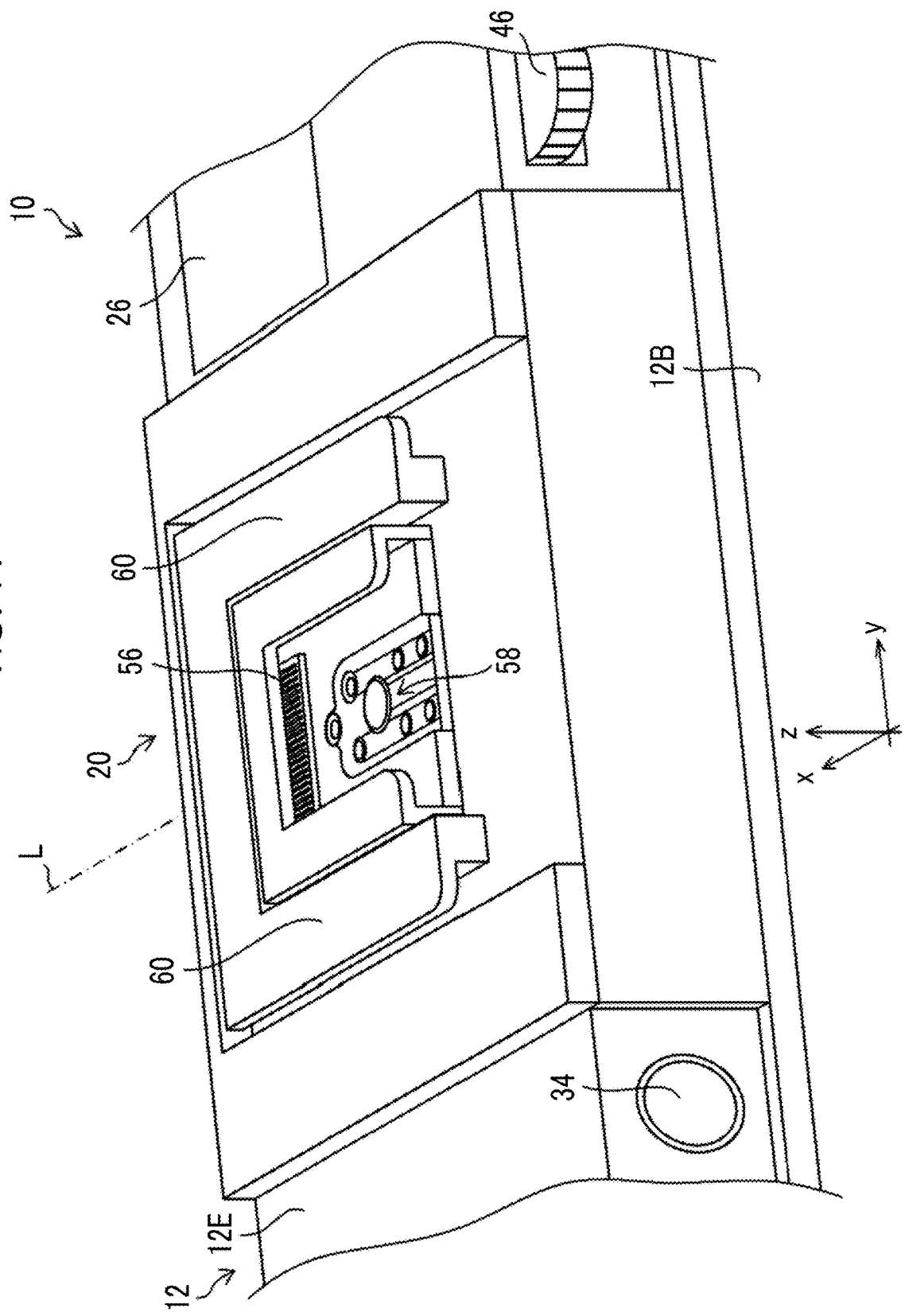
FIG. 11 is an enlarged perspective view of the upper surface of the camera body including an accessory shoe.

FIG. 11 is an enlarged perspective view of the upper surface 12E of the camera body 12 including the accessory shoe 20. The accessory shoe 20 includes an output-side connector 56 for an image signal for the finder that is provided along the y direction on the front surface 12A of the camera body 12. Further, the accessory shoe 20 is provided with a terminal group (a terminal such as a synchro terminal) 58 to be connected to a terminal group that is provided on the connection portion of a retrofit stroboscope (not shown). The retrofit stroboscope can communicate with the camera body 12 in a case in which the terminal groups are electrically connected to each other.

Further, a pair of rail members 60, which is a first reinforcing portion, is fixed to the upper surface 12E around the accessory shoe 20 so as to surround the accessory shoe 20. The longitudinal section of each rail member 60 taken in the z direction has an L shape, and the rail members 60 are provided along the x direction and are engaged with a pair of rail members 62 (see FIG. 10) that is a second reinforcing portion of the adapter 16 for an electronic view finder. The longitudinal section of each rail member 62 taken in the z direction also has an L shape, and the rail members 62 are provided along the x direction.

In a case in which the accessory shoe-mounting portion 54 of the adapter 16 for an electronic view finder is to be moved in the x direction (the direction A of FIG. 7) and is to be mounted on the accessory shoe 20, the rail members 60 and 62 function as guide members that connect a first connector 64 of the accessory shoe-mounting portion 54 to the output-side connector 56 of the accessory shoe 20. Further, in a state in which the first connector 64 is connected to the output-side connector 56, the rail members 60 and 62 have a function to reinforce the strength of a connection portion therebetween by an engagement force between the rail members 60 and 62.

Figure 12:
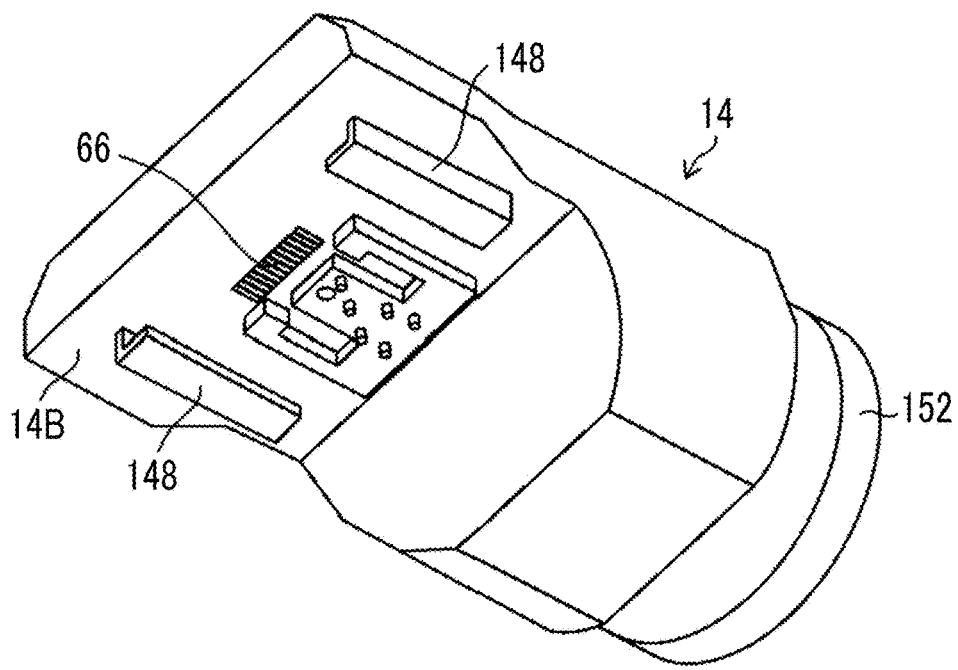
FIG. 12 is a perspective view of the electronic view finder that is viewed from the lower side.
Figure 13:
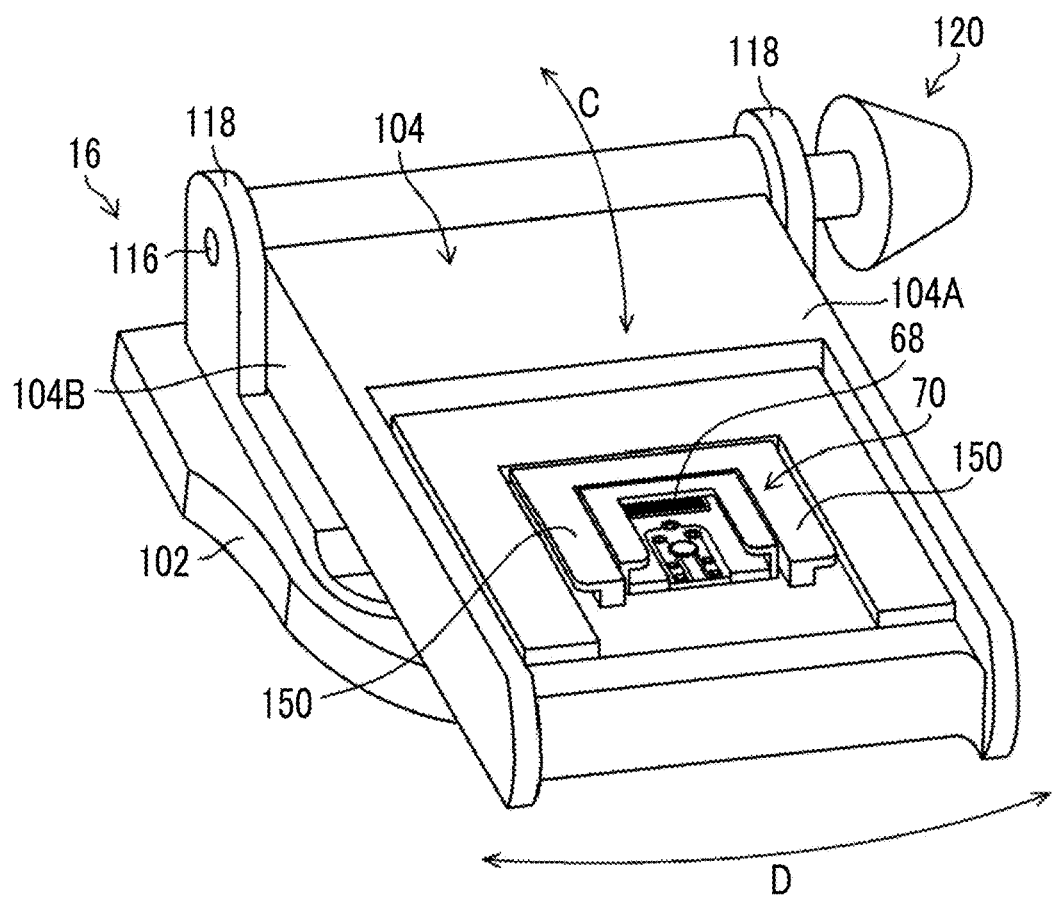
FIG. 13 is a perspective view of the adapter for an electronic view finder that is viewed from the upper side.

Incidentally, in the digital camera 10 of the embodiment, the electronic view finder 14 is used while being offset from the accessory shoe 20. Here, description will be made with reference to FIGS. 12 and 13. FIG. 12 is a perspective view of the electronic view finder 14 that is viewed from the lower side, and FIG. 13 is a perspective view of the adapter 16 for an electronic view finder that is viewed from the upper side.

During the use of the electronic view finder 14 shown in FIG. 6, a second connector 68 (see FIG. 13) to which an input-side connector 66 (see FIG. 12) for an image signal for the finder, which is provided on the electronic view finder 14, is connected, that is, a second connector 68 provided on an accessory shoe 70 (see FIG. 13), which is a second accessory shoe of the adapter 16 for an electronic view finder, is disposed at a position deviating from the accessory shoe-mounting portion 54 shown in FIG. 10 (a position laterally shifted from a position immediately above the accessory shoe-mounting portion 54). For this reason, moment caused by the weight of the electronic view finder 14 is applied to a connection portion between the output-side connector 56 and the first connector 64, but the strength of the connection portion is reinforced by the engagement force between the rail members 60 and 62. Accordingly, troubles, such as the unprepared separation and failure of the connection portion caused by the moment, are prevented.

<Shutter Button 28>

The shutter button 28 is provided on the upper surface of the grip 50 of the camera body 12. The shutter button 28 is formed of a so-called two-stage switch that has a half-pressed stage and a fully-pressed stage. In a case in which the shutter button 28 is half pressed, imaging preparation, that is, AE and AF are performed. In a case in which the shutter button 28 is fully pressed, main imaging, that is, imaging for recording is performed. AE is an abbreviation for automatic exposure, and is a function to allow the digital camera 10 to automatically measure the brightness of a subject and to determine appropriate exposure. Further, AF is an abbreviation for automatic focus, and is a function to allow the digital camera 10 to automatically measure a distance between a subject and the digital camera 10 and to focus on the subject.

<Power Supply Lever 30>

The power supply lever 30 is disposed coaxially with the shutter button 28 so as to be rotationally movable. In a case in which the power supply lever 30 is rotationally moved to an ON position, the power supply of the digital camera 10 is turned on. In a case in which the power supply lever 30 is rotationally moved to an OFF position, the power supply of the digital camera 10 is turned off <Play Button 32>

The play button 32 is a button that is used to switch the mode of the digital camera 10 to a play mode. The play button 32 is provided on the back surface 12B of the camera body 12, and is disposed above the main display 22. In a case in which the play button 32 is pressed in a state in which the mode of the digital camera 10 is set to an imaging mode, the mode of the digital camera 10 is switched to the play mode. In a case in which the mode of the digital camera 10 is set to the play mode, an image taken at the last is displayed on the main display 22.

A function to switch the mode of the digital camera 10 to the imaging mode from the play mode is assigned to the shutter button 28. In a case in which the shutter button 28 is pressed in a state in which the mode of the digital camera 10 is set to the play mode, the mode of the digital camera 10 is switched to the imaging mode.

<Delete Button 34>

The delete button 34 is a button used to instruct a taken image, which is displayed on the main display 22, to be deleted. The delete button 34 is provided on the back surface 12B of the camera body 12, and is disposed above the main display 22. In a case in which the delete button 34 is pressed in a state in which the taken image is displayed on the main display 22, a screen used to confirm deletion is displayed on the main display 22. In a case in which deletion is instructed to be performed according to a display on the main display 22, the taken image, which is being displayed, is deleted from a memory card.

<AF Lock Button 36>

The AF lock button 36 is a button that is used to instruct the lock of a focus. As shown in FIG. 2, the AF lock button 36 is provided on the back surface 12B of the camera body 12 and is disposed near the thumb rest 52. In a case in which the AF lock button 36 is pressed, a focus is locked.

<AE Lock Button 38>

The AE lock button 38 is a button that is used to instruct the lock of exposure. As shown in FIG. 2, the AE lock button 38 is provided on the back surface 12B of the camera body 12 and is disposed near the thumb rest 52. In a case in which the AE lock button 38 is pressed, exposure is locked.

<Menu Button 40>

The menu button 40 is a button that is used to call a menu screen on the main display 22. The menu button 40 is provided on the back surface 12B of the camera body 12. In a case in which the menu button 40 is pressed in a state in which the mode of the digital camera 10 is set to the imaging mode or the play mode, the menu screen is displayed on the main display 22. The menu button 40 also functions as an OK button, and is used to instruct an item to be selected, an item to be confirmed, and the like to be OK.

<Selector Button 42>

The selector button 42 is formed of four buttons, that is, an up button, a down button, a left button, and a right button that are arranged on the same circle having a center on the menu button 40. Functions according to the set states of the digital camera 10 are assigned to the respective buttons.

<BACK Button 44>

The BACK button 44 is a button that is used to instruct the display on the main display 22 to return to a state prior to one step. The BACK button 44 is provided on the back surface 12B of the camera body 12. In a case in which the BACK button 44 is pressed in a state in which various setting screens are displayed on the main display 22, a display on the main display 22 returns to a state prior to one step. Accordingly, an item to be selected, an item to be confirmed, and the like can be cancelled.

<Rear Command Dial 46>

The rear command dial 46 is rotatably supported in the camera body 12, and is provided so that a part of the outer periphery of the rear command dial 46 is exposed to the back surface 12B of the camera body 12. In the digital camera 10 of the embodiment, the rear command dial 46 is disposed at a position where the rear command dial 46 can be operated by the thumb of a hand gripping the camera body 12. Various functions are assigned to the rear command dial 46 according to the set state of the digital camera 10.

<Operation Dial 48>

The operation dial 48 is an example of a rotary operation dial, and is used for various settings of the digital camera 10. An item to be set by the operation dial 48 is selected by a user.

The operation dial 48 is provided on the upper surface 12E of the camera body 12. The operation dial 48 is provided at an end of the digital camera 10 of the embodiment corresponding to the grip portion. Accordingly, the operation dial 48 can be operated by a finger of the hand that grips the camera body 12.

<Control System>

Figure 9:
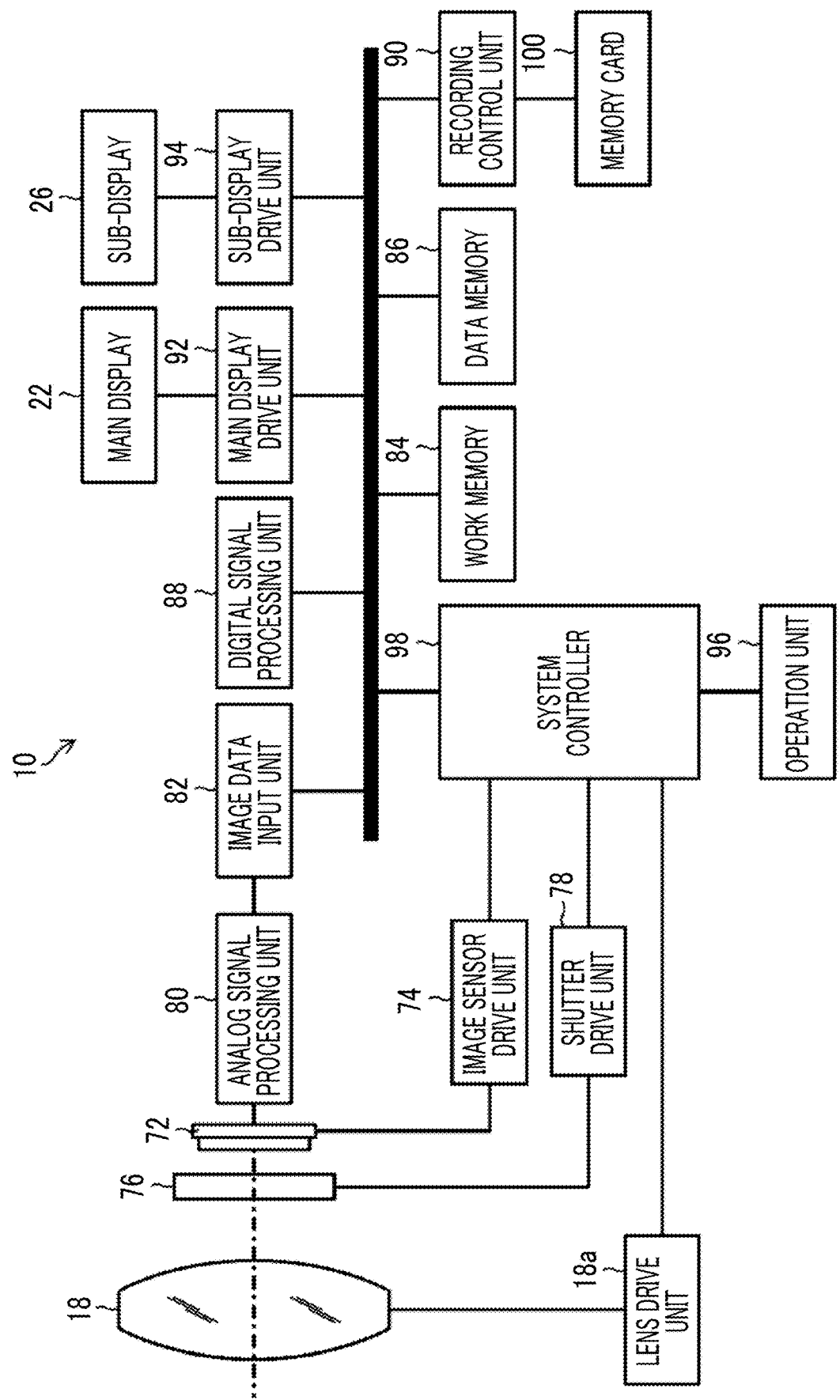
FIG. 9 is a block diagram showing the schematic configuration of a control system of the digital camera.

As shown in the block diagram of FIG. 9, the digital camera 10 of the embodiment includes an image sensor 72, an image sensor drive unit 74, a shutter 76, a shutter drive unit 78, an analog signal processing unit 80, an image data input unit 82, a work memory 84, a data memory 86, a digital signal processing unit 88, a recording control unit 90, a main display drive unit 92, a sub-display drive unit 94, an operation unit 96, a system controller 98, and the like.

The image sensor 72 converts an optical image of a subject, which is formed through the imaging lens 18, into electrical signals and outputs the electrical signals. A publicly known image sensor, such as a charged coupled device (CCD) image sensor or a complementary metal oxide semiconductor (CMOS) image sensor, is used as the image sensor 72.

The image sensor drive unit 74 drives the image sensor 72 according to a command output from the system controller 98.

The shutter 76 is formed of a square focal-plane shutter, and is disposed directly in front of the image sensor 72. FIG. 1 shows a state in which the shutter is fully opened.

The shutter drive unit 78 drives the shutter 76 according to a command output from the system controller 98.

The analog signal processing unit 80 receives the signals output from the image sensor 72, and performs required signal processing, such as correlated double sampling processing and amplification processing. Further, the analog signal processing unit 80 converts the analog image signals, which have been subjected to the required signal processing, into digital image signals and outputs the digital image signals.

The image data input unit 82 receives the digital image signals, which are output from the analog signal processing unit 80, according to a command output from the system controller 98. Received image data corresponding to one sheet is stored in the work memory 84.

The work memory 84 is used as a memory for work. The data memory 86 is formed of a non-volatile memory, such as an electrically erasable programmable read only memory (EEPROM), and data required for control and the like is stored in the work memory 84.

The digital signal processing unit 88 performs required signal processing, such as synchronization processing, white balance correction, gamma correction, and outline correction, on the image data received in the work memory 84, and generates predetermined image data formed of brightness data (Y data) and color difference data (Cr and Cb data).

The recording control unit 90 has access to the memory card 100 and reads and writes data according to a command output from the system controller 98. Image data, which is obtained from imaging, is recorded in the memory card 100.

The main display drive unit 92 drives the main display 22 according to a command output from the system controller 98.

The sub-display drive unit 94 drives the sub-display 26 according to a command output from the system controller 98.

The operation unit 96 includes the shutter button 28, the power supply lever 30, the play button 32, the delete button 34, the AF lock button 36, the AE lock button 38, the menu button 40, the selector button 42, the BACK button 44, the rear command dial 46, the operation dial 48, and the like. The operation unit 96 outputs a signal, which corresponds to the operation of each operation member, to the system controller 98.

The system controller 98 is a control unit that controls the operation of each unit of the digital camera 10. The system controller 98 is formed of a microcomputer. That is, the microcomputer functions as the system controller 98 by executing a predetermined control program, and functions as a control unit that controls the operation of each unit of the digital camera 10.

The system controller 98 also functions as a control unit for the imaging lens 18. The system controller 98 controls the operation of the imaging lens 18 through a lens drive unit 18a provided for the imaging lens 18. The imaging lens 18 comprises a stop, a focus lens, and the like. The lens drive unit 18a comprises a stop drive unit that drives the stop, a focus lens drive unit that drives the focus lens, and the like.

[Adapter 16 for Electronic View Finder]

Description will be made with reference to FIGS. 10, 11, 12, 13, and the like.

The adapter 16 for an electronic view finder is an adapter that is used to attachably and detachably mount the electronic view finder 14 on the accessory shoe 20 of the camera body 12. The adapter 16 for an electronic view finder includes a base member 102 that includes the accessory shoe-mounting portion 54 to be attachably and detachably mounted on the accessory shoe 20 and the first connector 64 that is provided on the accessory shoe-mounting portion 54 and is to be attachably and detachably connected to the output-side connector 56 provided on the accessory shoe 20 in conjunction with the attachment/detachment of the accessory shoe-mounting portion 54 to/from the accessory shoe 20. Further, the adapter 16 for an electronic view finder includes a tilting member 104 that is mounted on the base member 102 so as to be tiltable in the direction of an arrow C of FIGS. 10 and 13 (up-down direction), and the accessory shoe 70 that is a second accessory shoe provided on an upper surface 104A of the tilting member 104. Furthermore, the adapter 16 for an electronic view finder comprises the second connector 68 that is provided on the accessory shoe 70, is to be attachably and detachably connected to the input-side connector 66 for an image signal for the finder provided on the electronic view finder 14, and is electrically connected to the first connector 64. A flexible print substrate (not shown) is used as means for electrically connecting the first connector 64 to the second connector 68.

<Base Member 102>

The base member 102 is a box that is formed in a substantially semicircular shape in plan view, and the accessory shoe-mounting portion 54, the first connector 64, and the pair of rail members 62 are disposed at predetermined positions on a bottom 102B of the base member 102. Further, a pan shaft 114, which supports a pan table 112 as a pan member to allow the pan table 112 to be movable rotationally with respect to the base member 102 in the direction of an arrow D of FIGS. 10 and 13 (horizontal direction), is provided in the base member 102. The pan table 112 is mounted on an upper surface 102A of the base member 102 so as to be movable rotationally about the pan shaft 114. The pan shaft 114 may be a shaft or may be a virtual element.

<Tilting Member 104>

The tilting member 104 is a plate-like body that is formed in a substantially rectangular shape in plan view, and is connected to a tilt shaft 116 of the pan table 112 so as to be tiltable in the up-down direction. The adapter 16 for an electronic view finder is mounted on the accessory shoe 20 of the camera body 12, and the tilt shaft 116 is supported by a pair of tilt arms 118, which is fixed to a portion of the pan table 112 facing the subject side, so as to be movable rotationally at a position of FIG. 6 where the tilting member 104 is disposed at the center position, that is, a position of FIG. 6 where the electronic view finder 14 mounted on the adapter 16 for an electronic view finder faces a subject. An end portion 104B of the tilting member 104 facing the subject side is connected to the tilt shaft 116. Accordingly, the tilting member 104 is tilted in a state in which the tilting member 104 is supported in the form of a cantilever by the tilt arms 118 disposed to face the subject side.

<Pan Table 112>

In the adapter 16 for an electronic view finder, the pan table 112 is provided between the base member 102 and the tilting member 104 and supports the tilting member 104 so that the tilting member 104 is movable rotationally about the pan shaft 114 in the horizontal direction. The pan table 112 is not an essential component in the adapter for an electronic view finder of the invention, and is optionally provided in the adapter 16 for an electronic view finder. In the form of the adapter for an electronic view finder not including the pan table 112, the tilting member 104 may be supported by the base member 102 so as to be tiltable in the up-down direction.

Further, the adapter 16 for an electronic view finder comprises a tilt restricting member 120 (see FIG. 13) that restricts the tilt of the tilting member 104 and release the regulation of the tilt of the tilting member 104 and a pan restricting member 122 (see FIG. 10) that restricts the rotational movement of the tilting member 104 and releases the regulation of the rotational movement of the tilting member 104.

<Tilt Restricting Member 120>

Figure 14:
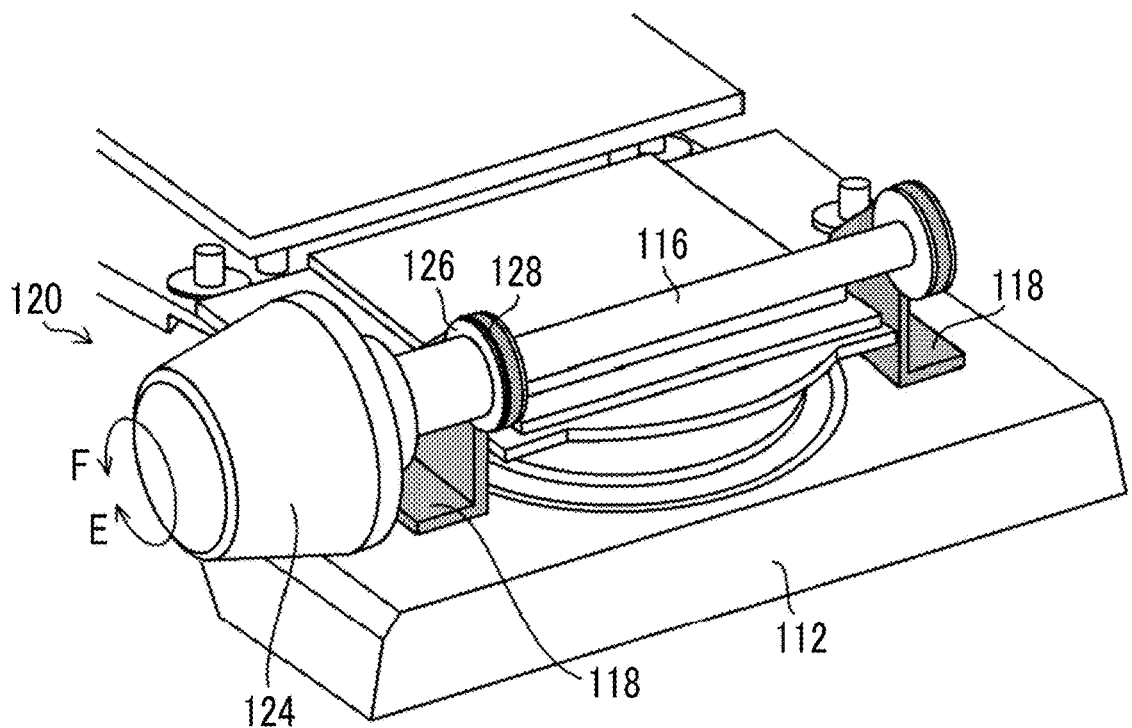
FIG. 14 is a perspective view showing main components of a tilt restricting member.

FIG. 14 is a perspective view showing main components of the tilt restricting member 120.

The tilt restricting member 120 comprises a tilt lock dial 124 that is screwed with an end portion of the tilt shaft 116, and a rubber washer 128 that is interposed between an end portion flange 126 of the tilt lock dial 124 and the tilt arm 118.

According to the tilt restricting member 120 of the embodiment, in a case in which the tilt lock dial 124 is tightened to the end portion of the tilt shaft 116 in the direction of an arrow E, the end portion flange 126 comes into pressure contact with the side surface of the tilt arm 118 through the rubber washer 128 and the rotational movement of the tilt shaft 116 is restricted by a frictional force in the direction of the rotational movement of the tilt shaft 116 that is caused by the pressure contact. Further, since the frictional force in the direction of the rotational movement of the tilt shaft 116 is removed in a case in which the tilt lock dial 124 is loosened in the direction of an arrow F, the regulation of the tilt of the tilting member 104 is released. The form of the tilt restricting member 120 is not limited to a form shown in FIG. 14, and the tilt restricting member 120 can have only to hold the tilting member 104 at a desired tilt position by restricting the rotational movement of the tilt shaft 116.

<Pan Restricting Member 122>

Figure 15:
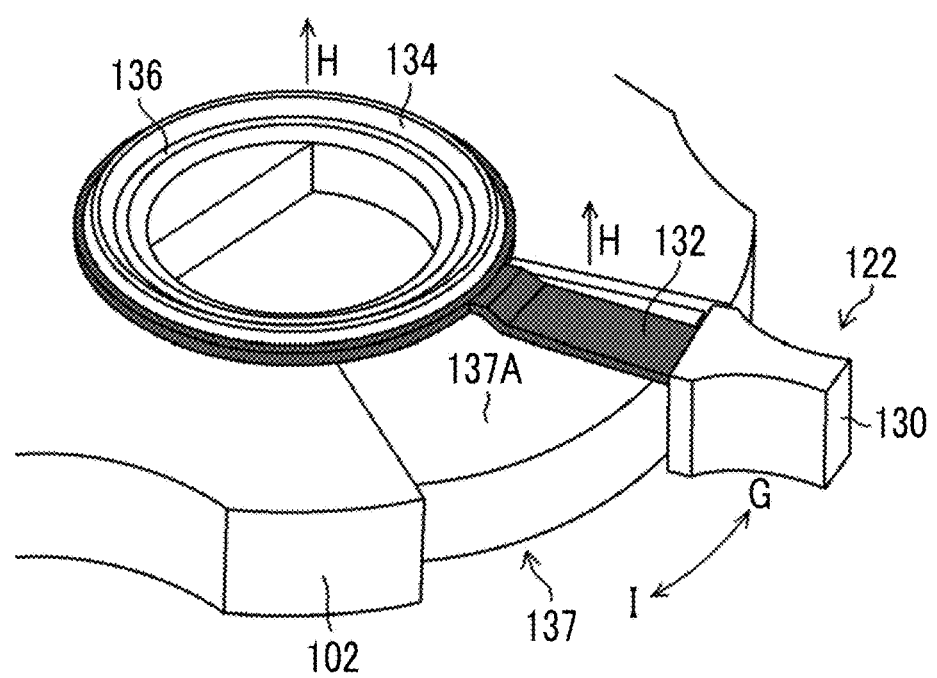
FIG. 15 is a perspective view showing main components of a pan restricting member.
Figure 16:
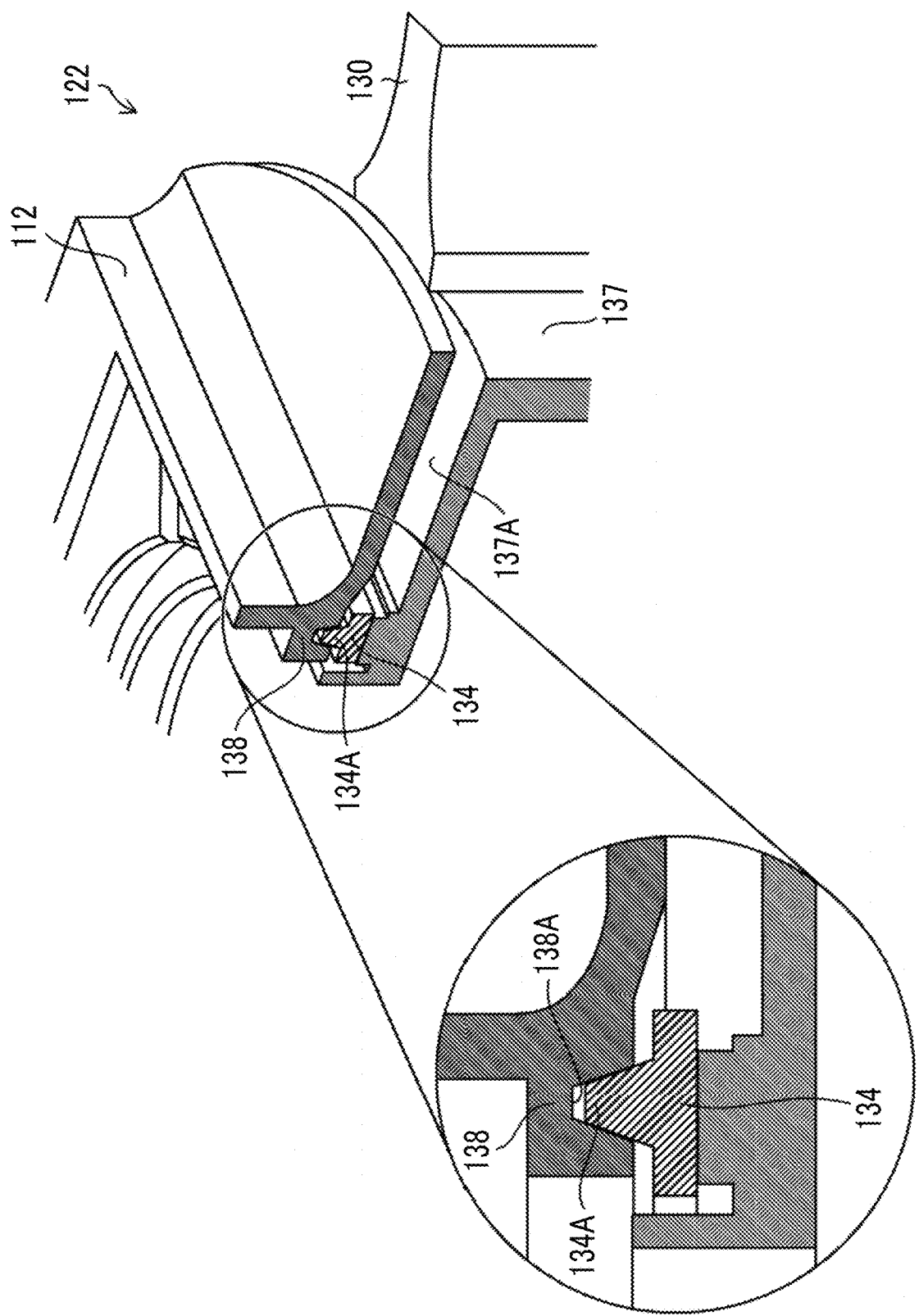
FIG. 16 is an enlarged cross-sectional view showing the main components shown in FIG. 15.

FIG. 15 is a perspective view showing main components of the pan restricting member 122, and FIG. 16 is an enlarged cross-sectional view showing the main components shown in FIG. 15.

The pan restricting member 122 includes a pan lock lever 130 that protrudes outward from the side surface of the base member 102, and a friction ring 134 that is connected to the pan lock lever 130 through an arm 132 and is disposed along a revolving seat 136 of the base member 102. Further, the pan restricting member 122 includes a tapered guide member 137 which is fixed in the base member 102 and with which the arm 132 is in sliding contact. The arm 132 is in sliding contact with an inclined surface 137A of the tapered guide member 137. The inclined surface 137A is formed to be inclined as coming close to a bottom 112B of the pan table 112 in a direction in which the pan lock lever 130 is to be operated, that is, the direction of an arrow G. Accordingly, in a case in which the pan lock lever 130 is operated in the direction of the arrow G, the arm 132 is moved in the direction of an arrow H (a direction in which the arm 132 comes close to the bottom 112B of the pan table 112) along the inclined surface 137A of the tapered guide member 137. Therefore, the friction ring 134 is also moved in the direction of the arrow H. Furthermore, the pan restricting member 122 includes a friction ring 138 that is provided on the bottom of the pan table 112. The friction ring 138 is disposed so as to face the friction ring 134, and comprises a recessed portion 138A to which a protruding portion 134A of the friction ring 134 is to be fitted.

According to the pan restricting member 122 of the embodiment, in a case in which the pan lock lever 130 is operated in the direction of an arrow G, the friction ring 134 is moved in the direction of an arrow H through the arm 132 and the protruding portion 134A of the friction ring 134 is fitted to the recessed portion 138A of the friction ring 138. The rotational movement of the tilting member 104 in the horizontal direction is restricted by a frictional force in the direction of the rotational movement of the pan shaft 114 that is caused by the fitting. Further, in a case in which the pan lock lever 130 is operated in the direction of an arrow I, the protruding portion 134A is separated from the recessed portion 138A and the frictional force in the direction of the rotational movement of the pan shaft 114 is removed. Accordingly, the regulation of the rotational movement of the tilting member 104 is released. The form of the pan restricting member 122 is not limited to a form shown in FIGS. 15 and 16, and the pan restricting member 122 can have only to hold the tilting member 104 at a desired pan position by restricting the rotational movement of the pan shaft 114.

Figure 17:
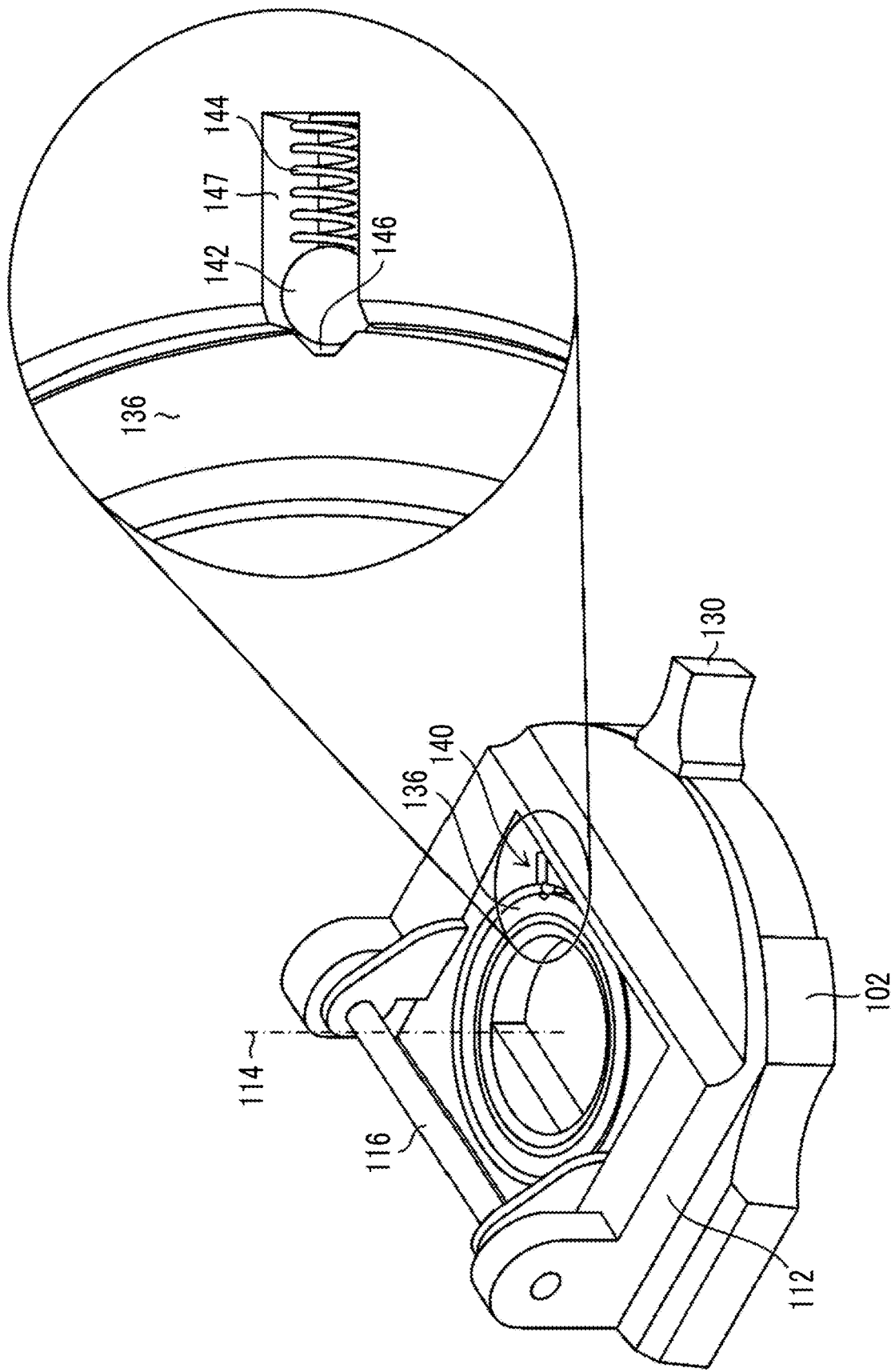
FIG. 17 is a perspective view showing main components of a center recognition unit.

The pan table 112 of the adapter 16 for an electronic view finder is provided with a center recognition unit 140 that recognizes the center position of the tilting member 104 with respect to the base member 102 (see FIG. 17).

<Center Recognition Unit 140>

Here, the center position of the tilting member 104 with respect to the base member 102 is the above-mentioned position of FIG. 6. That is, the center position means a position where the electronic view finder 14 mounted on the adapter 16 for an electronic view finder faces a subject.

FIG. 17 is a perspective view showing main components of the center recognition unit 140.

The center recognition unit 140 comprises a click ball 142, a spring 144, and a click ball-fitting groove 146.

The click ball 142 is disposed in a recessed portion 147 that is formed by notching a part of an edge portion of an opening in which the pan shaft 114 of the pan table 112 is disposed. Further, the spring 144 is also disposed in the recessed portion 147, and the click ball 142 is biased toward the outer peripheral surface of the revolving seat 136 of the base member 102 by the spring 144. The click ball-fitting groove 146 is formed on the outer peripheral surface of the revolving seat 136, and a position where the click ball-fitting groove 146 is formed is a position corresponding to a position where the electronic view finder 14 faces a subject in a case in which the pan table 112 is moved rotationally with respect to the base member 102.

Accordingly, according to the center recognition unit 140 of the embodiment, in a case in which the pan table 112 is moved rotationally with respect to the base member 102 and the click ball 142 is fitted to the click ball-fitting groove 146, the tilting member 104 is set to the center position.

The form of the center recognition unit 140 is not limited to a form that uses the click ball 142 shown in FIG. 17, and graduations, which allow the center position to be recognized, may be provided on the base member 102 and the pan table 112. Further, a form in which sound or light is generated to allow the center position to be electronically recognized may be employed. That is, the center recognition unit 140 may be a mechanical unit that uses the click ball 142 or the graduations, or may be an electronic unit that uses sound or light.

As shown in FIG. 13, a pair of rail members 150, which is a fourth reinforcing portion, is provided on the upper surface 104A of the tilting member 104. A pair of rail members 148, which is a third reinforcing portion provided around the input-side connector 66 of the electronic view finder 14 shown in FIG. 12, is engaged with the rail members 150. Accordingly, a connection portion between the second connector 68 and the input-side connector 66 of the electronic view finder 14 can be reinforced by an engagement force between the rail members 148 and 150. The rail members 148 and 150 will be described in the column of the following electronic view finder 14.

[Electronic View Finder 14]

The electronic view finder 14 is an electronic finder in which an LCD and an optical system are built. The input-side connector 66 for an image signal for the finder is provided on a bottom 14B of the electronic view finder 14, and an eyepiece part 152 into which a user looks is provided at the rear portion of the electronic view finder 14. The input-side connector 66 is attachably and detachably connected to the second connector 68 of the adapter 16 for an electronic view finder in a case in which the electronic view finder 14 is mounted on the adapter 16 for an electronic view finder.

Further, in the adapter 16 for an electronic view finder, the pair of rail members 150, which is the fourth reinforcing portion, is fixed to the upper surface 104A of the tilting member 104 around the accessory shoe 70 so as to surround the accessory shoe 70. The longitudinal section of each rail member 150 taken in the z direction has an L shape, and the rail members 150 are provided along the x direction and are engaged with the pair of rail members 148 that is the third reinforcing portion of the electronic view finder 14. The longitudinal section of each rail member 148 taken in the z direction also has an L shape, and the rail members 148 are provided along the x direction.

In a case in which the input-side connector 66 of the electronic view finder 14 is to be moved in the x direction (the direction B of FIG. 7) and is to be mounted on the accessory shoe 70, the rail members 148 and 150 function as guide members that connect the input-side connector 66 to the second connector 68. Further, in a state in which the input-side connector 66 is connected to the second connector 68, the rail members 148 and 150 have a function to reinforce the strength of a connection portion therebetween by an engagement force between the rail members 148 and 150.

Since the rail members 148 and the rail members 62 shown in FIG. 10 have the same size, the electronic view finder 14 can be directly connected to the accessory shoe 20 of the camera body 12. In this case, the input-side connector 66 of the electronic view finder 14 is connected to the output-side connector 56 of the camera body 12.

Furthermore, as shown in FIG. 6, an accessory shoe 160 on which the retrofit stroboscope is to be mounted is provided on an upper surface 14A of the electronic view finder 14. A pair of rail members 162 is provided even around the accessory shoe 160, and the rail members 162 are engaged with a pair of rail members provided on the retrofit stroboscope.

[Method of Using Adapter 16 for an Electronic View Finder]

Next, an example of a method of using the adapter 16 for an electronic view finder having the above-mentioned structure will be described.

First, the first connector 64 of the adapter 16 for an electronic view finder, which is separated from the camera body 12, is connected to the output-side connector 56 of the accessory shoe 20 of the camera body 12. Since a method of connecting the first connector 64 to the output-side connector 56 has been already described above, the description of the method will be omitted here. In this case, the connection portion between the first connector 64 and the output-side connector 56 is reinforced by the engagement force between the rail members 60 and 62.

Next, the input-side connector 66 of the electronic view finder 14, which is separated from the adapter 16 for an electronic view finder, is connected to the second connector 68 of the adapter 16 for an electronic view finder. Since a method of connecting the input-side connector 66 to the second connector 68 has been already described above, the description of the method will be omitted here. In this case, the connection portion between the second connector 68 and the input-side connector 66 is reinforced by the engagement force between the rail members 148 and 150.

The electronic view finder 14 is mounted on the camera body 12 through the adapter 16 for an electronic view finder by the above-mentioned assembly procedure.

Next, the posture of the electronic view finder 14 at the time of imaging is adjusted. That is, the tilting member 104 of the adapter 16 for an electronic view finder is tilted with respect to the pan table 112 to adjust the eyepiece part 152 of the electronic view finder 14 to a desired tilt position. Then, the tilt lock dial 124 of the tilt restricting member 120 is tightened to the end portion of the tilt shaft 116 to hold the tilt position of the eyepiece part 152 at a desired position. After that, the pan table 112 is moved rotationally with respect to the base member 102 and is adjusted to a desired pan position. Then, the pan lock lever 130 of the pan restricting member 122 is operated to hold the pan position of the electronic view finder 14 at a desired position. After that, a user takes an image of a subject while looking into the eyepiece part 152. Further, in a case in which a user wants to change the position of the eyepiece part 152 from the above-mentioned position, the user may appropriately adjust the tilt position and the pan position of the tilting member 104 according to the above-mentioned procedure.

Figure 18:
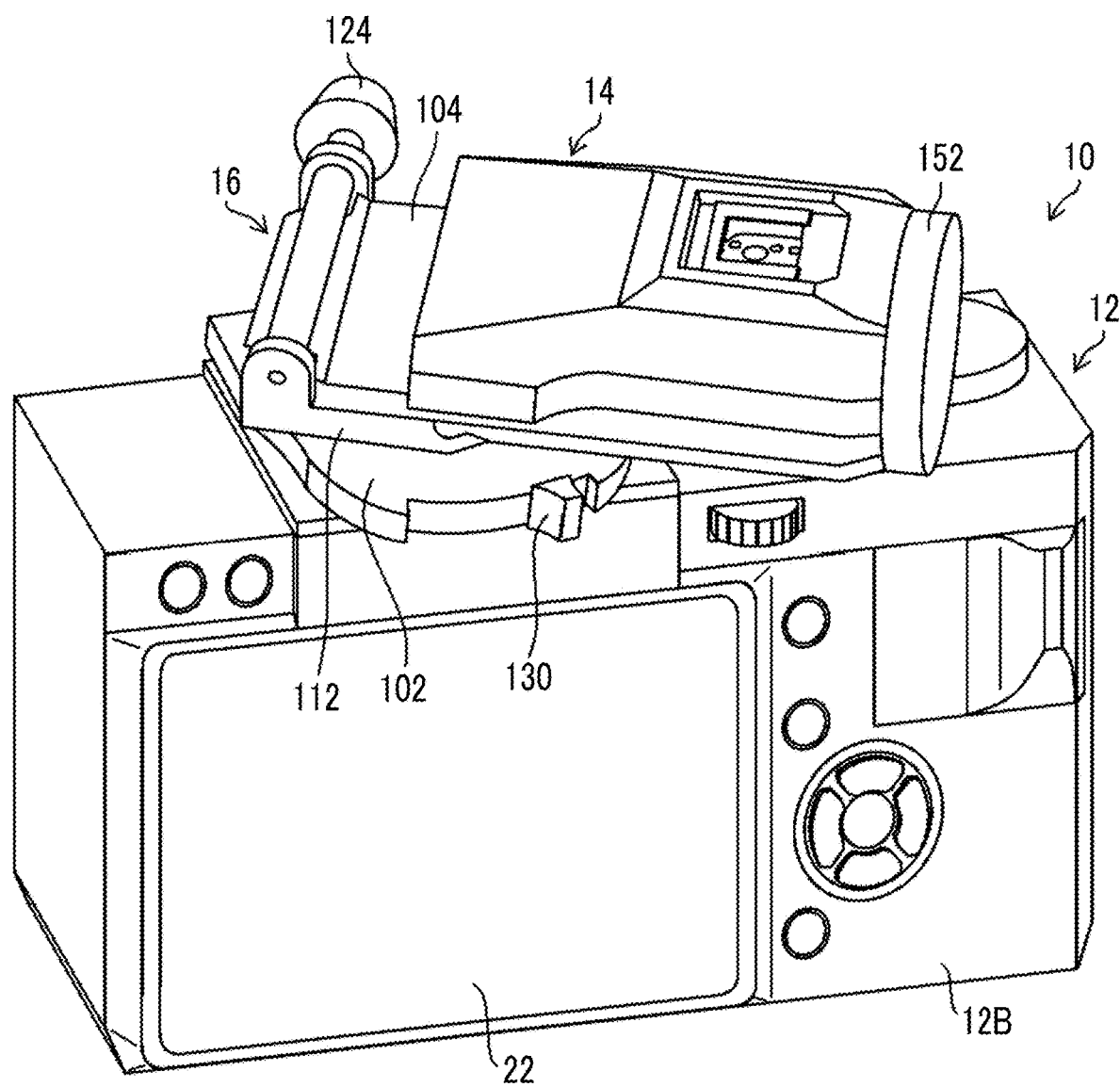
FIG. 18 is a diagram showing that a tilting member is held at a pan position where the tilting member is rotationally moved to the right from a center position by an angle of 45° as viewed from a user.
Figure 19:
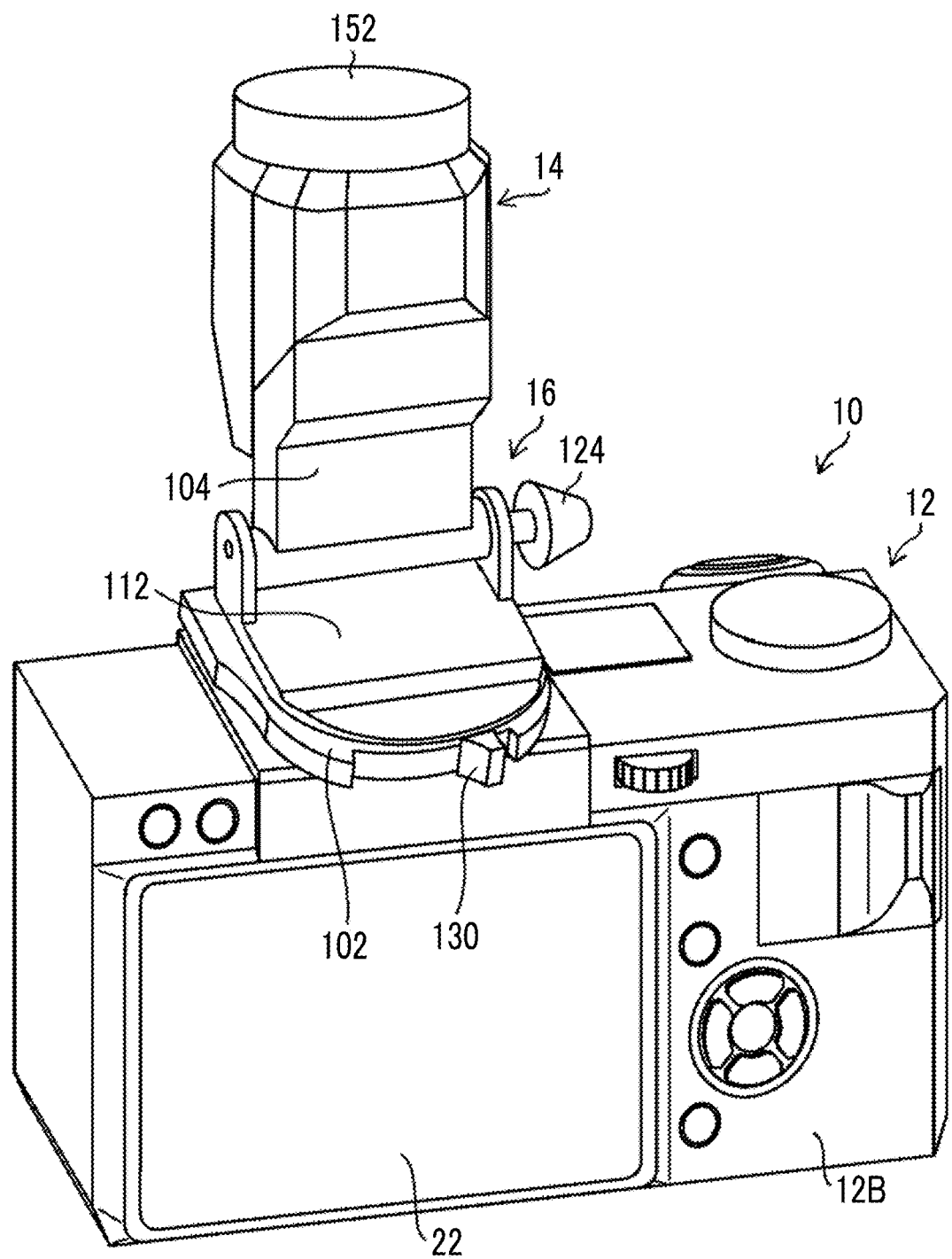
FIG. 19 is a diagram showing that the tilting member is held at a tilt position where the tilting member is tilted upward from the center position by an angle of 90° as viewed from a user.

Description will be made using one example. The electronic view finder 14 of FIG. 18 is a form where the tilting member 104 (electronic view finder 14) is held at a pan position where the tilting member 104 is moved rotationally to the right side from the center position by an angle of 45° as seen from a user. In this form, the tilt angle of the tilting member 104 (electronic view finder 14) is 0°. In this case, a user takes an image while looking into the eyepiece part 152 of the electronic view finder 14 from the right rear side of the back surface 12B of the camera body 12. Further, the electronic view finder 14 of FIG. 19 is a form where the tilting member 104 (electronic view finder 14) is held at a tilt position where the tilting member 104 is tilted upward from the center position by an angle of 90° as seen from a user. In this form, the rotation angle of the tilting member 104 (electronic view finder 14) is 0°. In this case, a user takes an image while looking into the eyepiece part 152 of the electronic view finder 14 from the upper side of the upper surface 12E of the camera body 12.

It is preferable that the adapter 16 for an electronic view finder is provided with a stopper member restricting the tilt range of the tilting member 104 and a stopper member restricting the rotation range of the tilting member 104. The tilt position and the pan position of the electronic view finder 14 may be adjusted in the tilt range and the rotation range.

Since the adapter 16 for an electronic view finder including the tilting member 104 is provided as described above, the object of the invention can be achieved.

That is, according to the adapter 16 for an electronic view finder of the embodiment, since the adapter 16 for an electronic view finder includes the tilting member 104, the position of the electronic view finder 14 can be changed to a desired tilt position by the tilting member 104. Accordingly, user's imaging operability can be improved. Further, since the adapter 16 for an electronic view finder and the retrofit electronic view finder 14 may be carried during the carry of the camera, a space can be saved during the carry of the camera in comparison with a form in the related art where two electronic view finders should be carried. Furthermore, a user who does not need the function of the retrofit electronic view finder 14 confirms a subject using the main display 22 of the camera body 12 without mounting the electronic view finder 14 on the camera body 12 through the adapter 16 for an electronic view finder. Accordingly, the size of the camera can be reduced for a user who does not need the function of the retrofit electronic view finder 14.

Further, since the adapter 16 for an electronic view finder of the embodiment includes the pan table 112 between the base member 102 and the tilting member 104, the pan position of the electronic view finder can be changed to a desired pan position. Accordingly, the imaging operability of the electronic view finder 14 is further improved by a synergistic effect between the pan table 112 and the tilting member 104.

Furthermore, since the adapter 16 for an electronic view finder of the embodiment includes the tilt restricting member 120 and the pan restricting member 122, a subject can be confirmed in a state in which the tilt position and the pan position of the electronic view finder 14 are restricted (locked) at a desired posture.

Moreover, the pan table 112 of the adapter 16 for an electronic view finder of the embodiment is provided with the center recognition unit 140 that recognizes the center position of the tilting member 104 with respect to the base member 102. Accordingly, since a user can easily recognize the center position of the tilting member 104 in a case in which the user wants to face and confirm a subject by the electronic view finder 14 in a state in which the tilting member 104 corresponds to the center position, it is convenient.

Further, according to the adapter 16 for an electronic view finder of the embodiment, the accessory shoe 70 is provided on the tilting member 104 at a position deviating from the accessory shoe-mounting portion 54 in a case in which the base member 102 and the tilting member 104 are parallel to each other. Accordingly, for example, in a case in which the base member 102 and the tilting member 104 are parallel to each other in a state in which the tilting member 104 corresponds to the center position, a user can look into the electronic view finder 14 at a position where the user's face is spaced from the back surface 12B of the camera body 12.

Furthermore, according to the digital camera 10 of the embodiment, a load, which is applied to the accessory shoe 20 of the camera body 12 and is caused by the weight of the adapter 16 for an electronic view finder and the electronic view finder 14, can be eliminated by the engagement force between the rail members 60 and 62. Accordingly, damage to the accessory shoe 20 can be prevented. Further, since the holding of the adapter 16 for an electronic view finder on the camera body 12 and the connection between the output-side connector 56 and the first connector 64 can be performed by the same operation using the engagement between the rail members 60 and 62, it is possible to connect the first connector 64 to the output-side connector 56 while holding the adapter 16 for an electronic view finder on the camera body 12. That is, the first connector 64 can be stably connected to the output-side connector 56.

Furthermore, according to the electronic view finder 14 of the embodiment, a load, which is applied to the input-side connector 66 of the electronic view finder and is caused by the weight of the electronic view finder 14, can be eliminated by the engagement force between the rail members 148 and 150. Accordingly, damage to the input-side connector 66 can be prevented. Moreover, since the holding of the electronic view finder 14 on the adapter 16 for an electronic view finder and the connection between the second connector 68 and the input-side connector 66 can be performed by the same operation using the engagement between the rail members 148 and 150, it is possible to connect the input-side connector 66 to the second connector 68 while holding the electronic view finder 14 on the adapter 16 for an electronic view finder. That is, the input-side connector 66 can be stably connected to the second connector 68.

A case in which the invention is applied to the lens-interchangeable digital camera 10 has been described in the embodiment by way of example, but the invention can also be applied to a camera integrated with a lens likewise. Further, a case in which the invention is applied to the non-reflex digital camera 10 has been described in the embodiment by way of example, but the invention can also be applied to a reflex digital camera likewise.

EXPLANATION OF REFERENCES

10: digital camera
12: camera body
12A: front surface
12B: back surface
12C: right side surface
12D: left side surface
12E: upper surface 12F: bottom
14: electronic view finder
16: adapter for electronic view finder
18: imaging lens
18a: lens drive unit
20: accessory shoe
22: main display
24: lens mount
26: sub-display
28: shutter button
30: power supply lever
32: play button
34: delete button
36: AF lock button
38: AE lock button
40: menu button
42: selector button
44: BACK button
46: rear command dial
48: operation dial
50: grip
52: thumb rest
54: accessory shoe-mounting portion
56: output-side connector
58: terminal group
60: rail member
62: rail member
64: first connector
66: input-side connector
68: second connector
70: accessory shoe
72: image sensor
74: image sensor drive unit
76: shutter
78: shutter drive unit
80: analog signal processing unit
82: image data input unit
84: work memory
86: data memory
88: digital signal processing unit
90: recording control unit
92: main display drive unit
94: sub-display drive unit
96: operation unit
98: system controller
100: memory card
102: base member
102A: upper surface
102B: bottom
104: tilting member
104A: upper surface
104B: end portion
112: pan table
112B: bottom
114: pan shaft
116: tilt shaft
118: tilt arm
120: tilt restricting member
122: pan restricting member
124: tilt lock dial
126: end portion flange
128: rubber washer
130: pan lock lever
132: arm
134: friction ring
134A: protruding portion
136: revolving seat
137: tapered guide member
137A: inclined surface
138: friction ring
138A: recessed portion
140: center recognition unit
142: click ball
144: spring
146: click ball-fitting groove
147: recessed portion
148: rail member
150: rail member
152: eyepiece part
160: accessory shoe
162: rail member

What is claimed is:

1. An adapter for an electronic view finder that is used to attachably and detachably mount an electronic view finder on a first accessory shoe of a camera body, the adapter for an electronic view finder comprising:
   a base member that includes an accessory shoe-mounting portion to be attachably and detachably mounted on the first accessory shoe;
   a first connector that is provided on the accessory shoe-mounting portion and is to be attachably and detachably connected to an output-side connector for an image signal for a finder provided on the first accessory shoe in conjunction with attachment/detachment of the accessory shoe-mounting portion to/from the first accessory shoe;
   a tilting member that is tiltably mounted on the base member;
   a second accessory shoe that is provided on the tilting member; and
   a second connector that is provided on the second accessory shoe, is to be attachably and detachably connected to an input-side connector for an image signal for a finder provided on the electronic view finder, and is electrically connected to the first connector.

2. The adapter for an electronic view finder according to claim 1, further comprising:
   a pan member that is provided between the base member and the tilting member and supports the tilting member to allow the tilting member to be movable rotationally.

3. The adapter for an electronic view finder according to claim 2, further comprising:
   a tilt restricting member that restricts a tilt of the tilting member and releases the regulation of the tilt of the tilting member; and
   a pan restricting member that restricts a rotational movement of the tilting member and releases the regulation of the rotational movement of the tilting member.

4. The adapter for an electronic view finder according to claim 2,
   wherein the pan member is provided with a center recognition unit that recognizes a center position of the tilting member with respect to the base member.

5. The adapter for an electronic view finder according to claim 1,
   wherein the second accessory shoe is provided on the tilting member at a position deviating from the accessory shoe-mounting portion in a case in which the base member and the tilting member are parallel to each other.

6. The adapter for an electronic view finder according to claim 1,
wherein the base member includes a second reinforcing portion that is to be engaged with a first reinforcing portion provided around the first accessory shoe of the camera body, and
the second reinforcing portion is a rail member that is to be engaged with the first reinforcing portion in a case in which the accessory shoe-mounting portion is mounted on the first accessory shoe.

7. The adapter for an electronic view finder according to claim 1,
wherein the tilting member includes a fourth reinforcing portion that is to be engaged with a third reinforcing portion provided around the input-side connector of the electronic view finder, and
the fourth reinforcing portion is a rail member that is to be engaged with the third reinforcing portion in a case in which the electronic view finder is mounted on the second accessory shoe.

8. A camera on which an adapter for an electronic view finder used to attachably and detachably mount an electronic view finder on a first accessory shoe of a camera body is mounted, the adapter for an electronic view finder including a base member that includes an accessory shoe-mounting portion to be attachably and detachably mounted on the first accessory shoe, a first connector that is provided on the accessory shoe-mounting portion and is to be attachably and detachably connected to an output-side connector for an image signal for a finder provided on the first accessory shoe in conjunction with attachment/detachment of the accessory shoe-mounting portion to/from the first accessory shoe, a tilting member that is tiltably mounted on the base member, a second accessory shoe that is provided on the tilting member, and a second connector that is provided on the second accessory shoe, is to be attachably and detachably connected to an input-side connector for an image signal for a finder provided on the electronic view finder, and is electrically connected to the first connector, the base member including a second reinforcing portion that is to be engaged with a first reinforcing portion provided around the first accessory shoe of the camera body, and the second reinforcing portion being a rail member that is to be engaged with the first reinforcing portion in a case in which the accessory shoe-mounting portion is mounted on the first accessory shoe,
the camera comprising:
the first reinforcing portion to be engaged with the second reinforcing portion of the adapter for an electronic view finder.

9. The camera according to claim 8,
wherein the first reinforcing portion is a rail member that is provided around the first accessory shoe of the camera body.

10. An electronic view finder that is mounted on an adapter for an electronic view finder used to attachably and detachably mount the electronic view finder on a first accessory shoe of a camera body, the adapter for an electronic view finder including a base member that includes an accessory shoe-mounting portion to be attachably and detachably mounted on the first accessory shoe, a first connector that is provided on the accessory shoe-mounting portion and is to be attachably and detachably connected to an output-side connector for an image signal for a finder provided on the first accessory shoe in conjunction with attachment/detachment of the accessory shoe-mounting portion to/from the first accessory shoe, a tilting member that is tiltably mounted on the base member, a second accessory shoe that is provided on the tilting member, and a second connector that is provided on the second accessory shoe, is to be attachably and detachably connected to an input-side connector for an image signal for a finder provided on the electronic view finder, and is electrically connected to the first connector, the tilting member including a fourth reinforcing portion that is to be engaged with a third reinforcing portion provided around the input-side connector of the electronic view finder, and the fourth reinforcing portion being a rail member that is to be engaged with the third reinforcing portion in a case in which the electronic view finder is mounted on the second accessory shoe,
the electronic view finder comprising:
the third reinforcing portion to be engaged with the fourth reinforcing portion of the adapter for an electronic view finder.

11. The electronic view finder according to claim 10,
wherein the third reinforcing portion is a rail member that is provided around the input-side connector of the electronic view finder.

* * * * *